US008219643B2

(12) United States Patent
Nakano et al.

(10) Patent No.: US 8,219,643 B2
(45) Date of Patent: Jul. 10, 2012

(54) SERVER/CLIENT SYSTEM FOR MANAGING THE TRANSMISSION AND USE OF COPYRIGHTED CONTENT, INFORMATION PROCESSING UNIT, INFORMATION PROCESSING METHOD, AND COMPUTER PROGRAM

(75) Inventors: Takehiko Nakano, Kanagawa (JP); Hisato Shima, Tokyo (JP); Kazuhiko Takabayashi, Tokyo (JP); Yasushi Minoya, Tokyo (JP)

(73) Assignee: Sony Corporation, Tokyo (JP)

( * ) Notice: Subject to any disclaimer, the term of this patent is extended or adjusted under 35 U.S.C. 154(b) by 1028 days.

(21) Appl. No.: 11/152,336

(22) Filed: Jun. 15, 2005

(65) Prior Publication Data
US 2006/0004770 A1    Jan. 5, 2006

(30) Foreign Application Priority Data

Jul. 5, 2004  (JP) ................................. 2004-197586

(51) Int. Cl.
*G06F 15/16* (2006.01)
*G06F 15/173* (2006.01)
(52) U.S. Cl. ........ 709/219; 709/203; 709/217; 709/223; 709/225
(58) Field of Classification Search .................. 709/217, 709/223, 225
See application file for complete search history.

(56) References Cited

U.S. PATENT DOCUMENTS

| 6,154,172 | A  | * | 11/2000 | Piccionelli et al. ........ 342/357.4 |
| 6,735,631 | B1 | * | 5/2004 | Oehrke et al. ................ 709/226 |
| 7,143,184 | B1 | * | 11/2006 | Shah et al. .................... 709/241 |
| 2002/0035516 | A1 | * | 3/2002 | Arima ............................. 705/26 |
| 2003/0105809 | A1 | * | 6/2003 | Yoshii et al. ................... 709/203 |
| 2004/0068579 | A1 | * | 4/2004 | Marmigere et al. .......... 709/242 |
| 2004/0103295 | A1 | * | 5/2004 | Gustafsson .................... 713/200 |
| 2004/0103303 | A1 | * | 5/2004 | Yamauchi et al. ............. 713/200 |
| 2004/0117619 | A1 | * | 6/2004 | Singer et al. .................. 713/156 |
| 2005/0044191 | A1 | * | 2/2005 | Kamada et al. ............... 709/223 |
| 2006/0015378 | A1 | * | 1/2006 | Mirrashidi et al. ............... 705/7 |
| 2007/0038950 | A1 | * | 2/2007 | Taniguchi et al. ............. 715/768 |

FOREIGN PATENT DOCUMENTS

JP    7-234785    9/1995

(Continued)

OTHER PUBLICATIONS

Server-Side vs. Client-Side Scripting [Online]. Sep. 16, 1999 [Retrieved on Jul. 15, 2008] Retrieved from: http://web.archive.org/web/19990916131435/http://www.asp101.com/tips/index.asp?id=25.*

(Continued)

*Primary Examiner* — Phuoc Nguyen
*Assistant Examiner* — Steven Nguyen
(74) *Attorney, Agent, or Firm* — Oblon, Spivak, McClelland, Maier & Neustadt, L.L.P.

(57) ABSTRACT

A method of information processing in a server/client system including a server for storing content and a client for receiving from the server and storing copy content of the content stored in the server. The method includes the steps of: the server generating at least either a content-ID list storing content-IDs corresponding to content for which use-expiration-date updating is permitted out of the copy content stored in the client or a content-ID list storing content-IDs corresponding to content for which use-expiration-date updating is not permitted, transmitting the content-ID list to the client; and the client selectively performing update processing of use-expiration date out of the copy content stored in that client or invalidation processing of the copy content stored in that client based on the content-ID list received from the server.

17 Claims, 17 Drawing Sheets

FOREIGN PATENT DOCUMENTS

| | | |
|---|---|---|
| JP | 11-259964 | 9/1999 |
| JP | 2003-233535 | 8/2003 |
| JP | 2003-242038 | 8/2003 |
| JP | 2004-110816 | 4/2004 |

OTHER PUBLICATIONS

Moni Naor, et al. "Certificate Revocation and Certificate Update", Proceedings of the USENIX Security Symposium, XP-002238503, Jan. 26, 1998, pp. 217-228.

* cited by examiner

FIG. 9B

| Device ID |
| Device Public Key |
| Signature by LA |

FIG. 9A

| ID of Source |
| ID of Destination |
| Number of entries (n) |
| Content-ID (1) |
| Content-ID (2) |
| : |
| Content-ID (n) |
| Random challenge from Destination |
| Signature by Source |

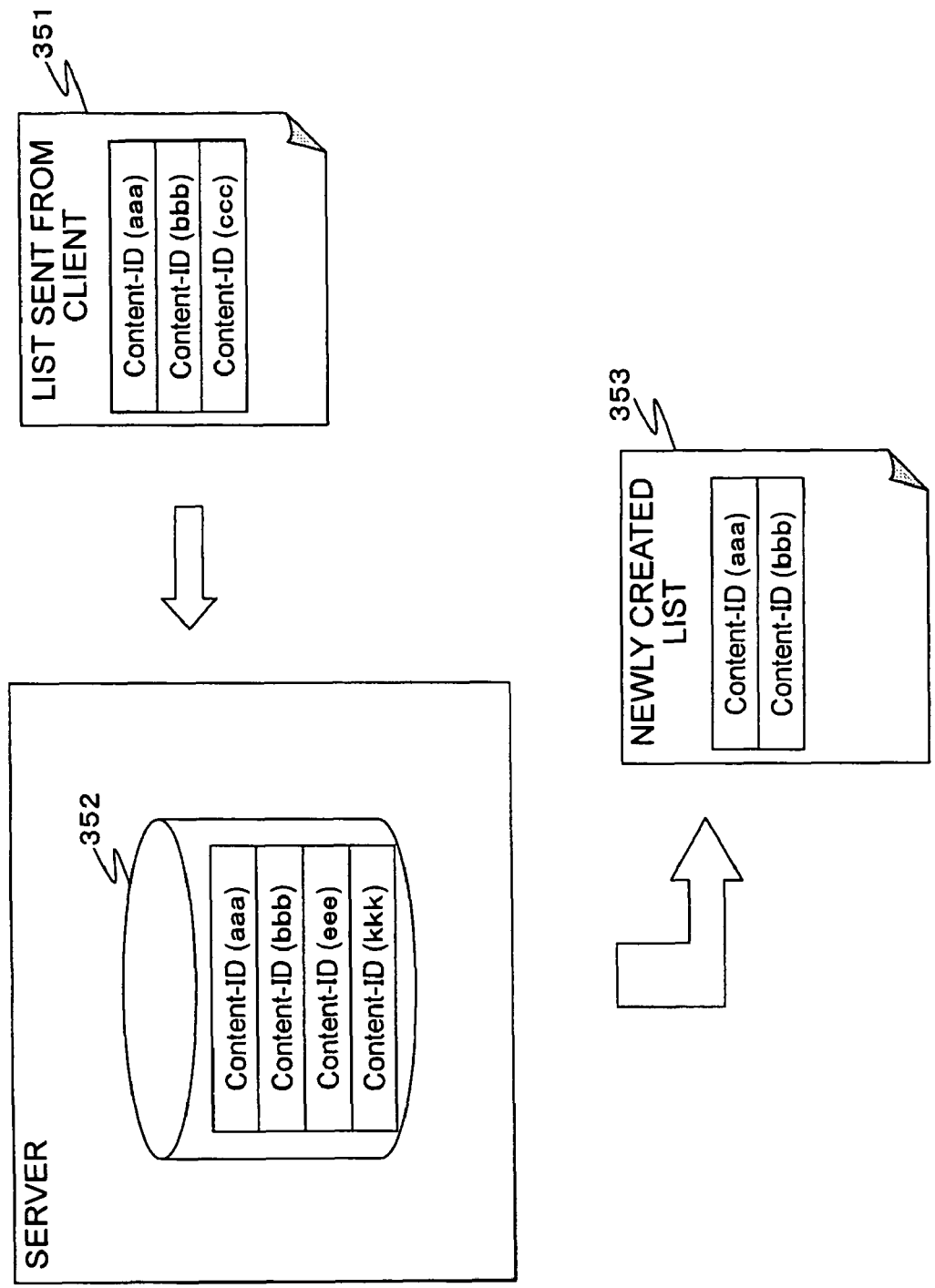

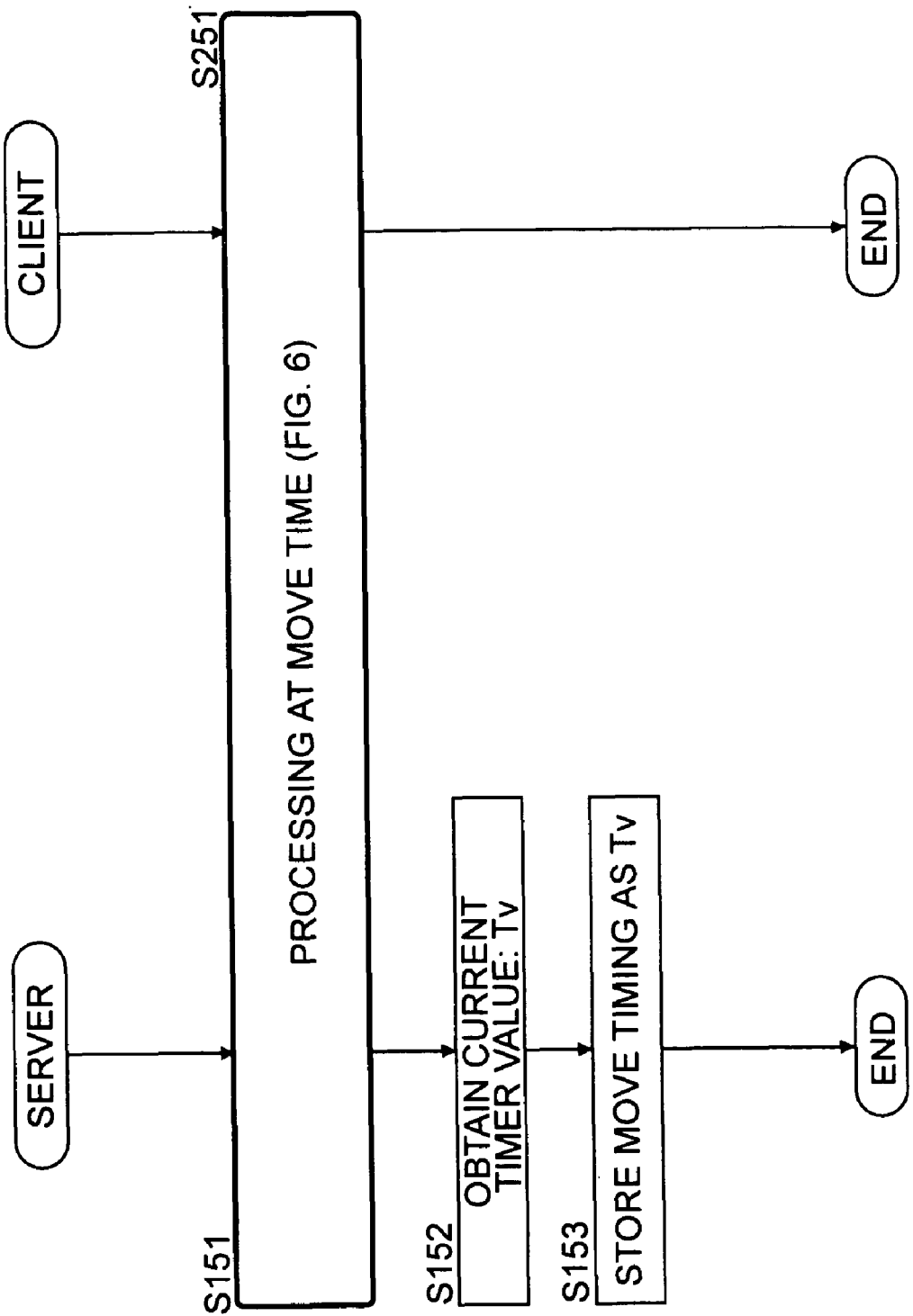

FIG. 16A

| ID of Source | ID of Destination | Number of entries (n) | Content-ID (1) | Content-ID (2) | ... | Content-ID (n) | Random challenge from Destination | Signature by Source |

Content-ID (1) through Content-ID (n): CONTENT-ID CORRESPONDING TO MOVED CONTENT

FIG. 16B

| Device ID | Device Public Key | Signature by LA |

SERVER/CLIENT SYSTEM FOR MANAGING THE TRANSMISSION AND USE OF COPYRIGHTED CONTENT, INFORMATION PROCESSING UNIT, INFORMATION PROCESSING METHOD, AND COMPUTER PROGRAM

CROSS REFERENCES TO RELATED APPLICATIONS

The present invention contains subject matter related to Japanese Patent Application JP 2004-197586 filed in the Japanese Patent Office on Jul. 5, 2004, the entire content of which are incorporated herein by reference.

BACKGROUND OF THE INVENTION

1. Field of the Invention

The present invention relates to a server/client system, an information processing unit, an information processing method, and a computer program. More particularly, the present invention relates to a server/client system, an information processing unit, an information processing method, and a computer program for implementing an efficient content-use management configuration when content stored in a server are copied to and used in a client such as a portable device, etc.

2. Description of the Related Art

In recent years, large-volume storage media, such as digital video discs (DVDs), the Internet, broadband communication networks (xDigital Subscriber Lines (xDSLs), cable TVs (CATVs), wireless networks, etc.), etc., have been developed and digital recording/reproducing apparatuses have become widespread. Thus, digital data, such as music data and image data, etc., has been distributed and used widely.

In general, distribution rights and the like, of many types of content, such as music data, image data, etc., are possessed by the creators or the dealers of such content. However, digital data can be recorded and reproduced without deteriorating the image and the sound of the original data, and thus the incidence of so-called distribution of pirated-edition discs, for example, distribution of illegally copied content through the Internet, copying content onto CD-Rs, etc., has become rampant;.

In order to prevent, such illegal copying of content, when content protected by copyright is distributed, it is common to impose certain conditions and restrictions on the use of the content. Thus, various systems and methods for restricting use of the content is employed, for example, only legal users are permitted to use the content by encrypting the content, and settings are established to restrict copying in order not to permit the production of a large number of copies. Such copy restrictions include, for example a setting to prohibit generation of all copies, a setting to permit only a single-generation copy, etc.

Content protection control is usually performed based on a certain rule. For example, when content to be copied, which is permitted to be copied a certain number of times, is transferred between devices, authentication among devices is performed to confirm the validity of a device on which the content is output. For example, Japanese Unexamined Patent Application Publication No. 2001-243707 has disclosed a configuration in which authentication processing is performed among the devices and content is output depending on the authentication result when a personal computer and a portable audio player, etc., are connected by a USB cable, etc., and copy data of copyrighted content such as audio data is output from the personal computer to the portable audio player.

Under Copyright Law, content, as the work of authors, is protected from illegal uses such as unauthorized reproduction and alteration. On the other hand, legal users of author's works are allowed to reproduce the content for personal use, that is to say, personal use at home and for a limited range of equivalent uses (See Article 30 of the Copyright Law).

However, when content is prohibited to be copied or the number of times it can be copied is restricted, as described above, various inconveniences occur in the above-described private use of that content. For example, when copy-prohibited content is recorded in a specific medium (for example, a DVD), a problem arises in that it becomes difficult for a device incapable of reproducing that medium (DVD), such as a portable device using a semiconductor memory as a recording medium, to use that content. Also, there is a problem in that free use of content, for example storing content recorded in a hard disk of a certain device into a hard disk of another device to use it, is not allowed.

A user sometimes legally obtains content from, for example a storage medium such as a DVD or from a server on the Internet, stores that content into a server connected to his/her home network, and then outputs a copy of the content to another terminal (client) possessed by that user, such as his/her mobile terminal, in order to enjoy the playback of that content while out of the house. Such a style of usage of content is regarded as within the permissible range of private use, and thus the content should be permitted to be copied and used. However, if content is prohibited to be copied or the number of times the content can be copied is restricted, as described above, or if copying of content has been carried out once, there arises a problem in that it becomes possible to use the content only on a device capable of using the medium in which that content is recorded.

As described above, if strict restrictions are imposed on the use of content, the convenience for a user's private use, which is originally admitted under Copyright Law, is impaired.

SUMMARY OF THE INVENTION

The present invention has been made in view of the problems described above. There is a need for providing a server/client system, an information processing unit, an information processing method, and a computer program for implementing an efficient content-use management configuration when content stored in an information processing unit, such as a home server, a personal computer, etc., is copied to and used in a portable device, etc.

In particular, it is desirable to set a use-permitted period corresponding to the copy of the content, and to perform content-use control based on the use-permitted period when content stored in an information processing unit, such as a home server, a personal computer, etc., is copied to a portable device, etc., for use. With this setting, it is desirable to provide a server/client system, an information processing unit, an information processing method, and a computer program in order to prevent illegal copying and use of content and to realize a convenient and highly flexible content-use environment for private users.

According to an embodiment of the present invention, there is provided a server/client system including: a server for storing content; and a client for receiving and storing copy content of the content stored in the server, wherein the client includes a storage part for storing a content-ID and use-expiration date information corresponding to the copy content received from the server in relation to each other, the server generates at least either a content-ID list storing content-IDs corresponding to content for which use-expiration-date updating is permitted out of the copy content stored in the client or a content-ID list storing content-IDs corresponding to content for which use-expiration-date updating is not permitted, for transmission to the client, and the client selectively performs update processing of a use-expiration date of the copy content stored in that client or invalidation processing of the copy content stored in that client based on the content-ID list received from the server.

Further, in an embodiment of the present invention, when the content-ID list received from the server is a content-ID list storing content-IDs corresponding to content for which use-expiration-date updating is permitted, the client performs update processing of the use-expiration date of the copy content corresponding to a content-ID included in the content-ID list out of the copy content stored in that client, and the client performs invalidation processing of the copy content corresponding to a content-ID not included in the content-ID list out of the copy content stored in that client.

Further, in an embodiment of the present invention, when the content-ID list received from the server is a content-ID list storing content-IDs corresponding to content for which use-expiration)-date updating is not permitted, the client performs invalidation processing of the copy content corresponding to a content-ID included in the content-ID list out of the copy content stored in that client, and the client performs update processing of the use-expiration date of the copy content corresponding to a content-ID not included in the content-ID list out of the copy content stored in that client.

Further, in an embodiment of the present invention, the server performs confirmation processing of the existence of the client in a private-use range, and executes transmission of the content-ID list to the client on the condition of having received the confirmation.

Further, in an embodiment of the present invention, the confirmation processing executed by the server of the existence of the client in a private-use range is performed as round-trip-time (RTT) check processing.

Further, in an embodiment of the present invention, the server performs notification processing of a content-invalidation request with a content-ID of content to be subjected to move processing to the client when performing move processing of the stored content, and the client performs invalidation processing of the copy content corresponding to the content-ID included in the content-invalidation request.

Further, in an embodiment of the present invention, the server holds move-processing execution timing Tv when performing move-processing of the stored content, executes comparison between the move-processing execution timing Tv and the copy-content use-expiration date setting processing timing Tr executed a previous time for the client when the client requests copy-content use-expiration date setting processing, and if the move-processing execution timing Tv is before the use-expiration date setting processing timing: Tr of the copy content executed the previous time, the server performs permission processing of a new use-expiration date setting of the copy content stored in the client without transmitting the content-ID list to the client.

Further, in an embodiment of the present invention, the server performs notification processing of a content-invalidation request with a content-ID of content to be subjected to move processing to the client and generates and holds a moved list relating a client-ID of a notification-incapable client to a content-ID of move content when performing move processing of the stored content, the server generates a deletion-content-ID list storing the content-ID recorded in the moved list corresponding to the client and sends the list to the client when the client requests the copy-content use-expiration date setting processing, the client performs invalidation processing of the copy content corresponding to the content-ID included in the deletion-content-ID list out of the copy content stored in that client, and the client performs update processing of the use-expiration date of the copy content corresponding to the content-ID not included in the deletion-content-ID list out of the copy content stored in that client.

According to another embodiment of the present invention, there is provided an information processing unit for storing content and functioning as a server to supply copy content to a client, including: a generator for generating, in response to reception of a copy-content use-expiration date setting request from a client, at least either a content-ID list storing content-IDs corresponding to content for which use-expiration-date updating is permitted out of the copy content stored in the client or a content-ID list storing content-IDs corresponding to content for which use-expiration-date updating is not permitted, for transmission to the client; and a transmission processor for transmitting the content-ID list to the client.

Further, in another embodiment of the present invention, the information processing unit performs confirmation processing of the existence of the client in a private-use range, and executes transmission of the content-ID list to the client on the condition of having received the confirmation.

Further, in another embodiment of the present invention, the confirmation processing of the existence of the client in a private-use range is performed as round-trip-time (RTT) check processing.

Further, in another-embodiment of the present invention, the information processing unit performs notification processing of a content-invalidation request with a content-ID of content to be subjected to move processing to the client when performing move processing of the stored content.

Further, in another embodiment of the present invention, the information processing unit holds move-processing execution timing Tv when performing move-processing of the stored content, executes comparison between the move-processing execution timing Tv and the copy-content use-expiration date setting processing timing Tr executed a previous time for the client when the client requests copy-content use-expiration date setting processing, and if the move-processing execution timing Tv is before the use-expiration date setting processing timing Tr of the copy content executed the previous time, the information processing unit performs permission processing of a new use-expiration date setting of the copy content stored in the client without transmitting the content-ID list to the client.

Further, in another embodiment of the present invention, the information processing unit performs notification processing of a content-invalidation request with a content-ID of content to be subjected to move processing to the client and generates and holds a moved list relating a client-ID of a notification-incapable client to a content-ID of move content when performing move processing of the stored content, and the information processing unit generates a deletion-content-ID list storing the content-ID recorded in the moved list corresponding to the client and sends the list to the client when the client requests the copy-content use-expiration date setting processing.

According to still another embodiment of the present invention, there is provided an information processing unit functioning as a client for receiving and storing copy content of content stored in a server, including a storage part for storing a content-ID and use-expiration date information corresponding to the copy content received from the server in relation to each other, wherein the information processing unit selectively performs update processing of a use-expiration date of the copy content stored in that client or invalidation processing of the copy content stored in that information processing unit based on the content-ID list received from the server.

Further, in still another embodiment of the present invention, when using copy content, the information processing unit compares a current timer value obtained from a timer and the use-expiration date information, and proceeds to content-use processing on the condition that the current timer value is smaller than the use-expiration date of the copy content to be used.

Further, in still another embodiment of the present invention, the content-ID list received from the server is a content-ID list storing content-IDs corresponding to content for which use-expiration-date updating is permitted, the information processing unit performs update processing of the use-expiration date of the copy content corresponding to a content-ID included in the content-ID list out of the copy content stored in that information processing unit, and the information processing unit performs invalidation processing of the copy content corresponding to a content-ID not included in the content-ID list out of the copy content stored in that information processing unit.

Further, in still another embodiment of the present invention, when the content-ID list received from the server is a content-ID list storing content-IDs corresponding to content for which use-expiration-date updating is not permitted, the information processing unit performs invalidation processing of the copy content corresponding to a content-ID included in the content-ID list out of the copy content stored in that information processing unit, and the information processing unit performs update processing of use-expiration date of the copy content corresponding to a content-ID not included in the content-ID list out of the copy content stored in that information processing unit.

According to a further embodiment of the present invention, there is provided a method of information processing in a server/client system including a server for storing content and a client for receiving from the server and storing copy content of the content stored in the server, the method including the steps of: the server generating at least either a content-ID list storing content-IDs corresponding to content for which use-expiration-date updating is permitted out of the copy content stored in the client or a content-ID list storing content-IDs corresponding to content for which use-expiration-date updating is not permitted, transmitting the content-ID list to the client; and the client selectively performing update processing of a use-expiration date of the copy content stored in that client or invalidation processing of the copy content stored in that client based on the content-ID list received from the server.

Furthermore, in a further embodiment of the present invention, when the content-ID list received from the server is a content-ID list storing content-IDs corresponding to content for which use-expiration-date updating is permitted, the client performs update processing of use-expiration date of the copy content corresponding to a content-ID included in the content-ID list out of the copy content stored in that client, and the client performs invalidation processing of the copy content corresponding to a content-ID not included in the content-ID list out of the copy content stored in that client.

Furthermore, in a further embodiment of the present invention, when the content-ID list received from the server is a content-ID list storing content-IDs corresponding to content for which use-expiration-date updating is not permitted, the client performs invalidation processing of the copy content corresponding to a content-ID included in the content-ID list out of the copy content stored in that client, and the client performs update processing of use-expiration date of the copy content corresponding to content-ID not included in the content-ID list out of the copy content stored in that client.

Furthermore, in a further embodiment of the present invention, the server performs confirmation processing of the existence of the client in a private-use range, and executes transmission of the content-ID list to the client on the condition of having received the confirmation.

Furthermore, in a further embodiment of the present invention, the confirmation processing executed by the server of the existence of the client in a private-use range is performed as round-trip-time (RTT) check processing.

Furthermore, in a further embodiment of the present invention, the server performs notification processing of a content-invalidation request with a content-ID of content to be subjected to move processing to the client when performing move processing of the stored content, and the client performs invalidation processing of the copy content corresponding to the content-ID included in the content-invalidation request.

Furthermore, in a further embodiment of the present invention, the server holds move-processing execution timing Tv when performing move-processing of the stored content, executes comparison between the move-processing execution timing Tv and the copy-content use-expiration date setting processing timing Tr executed a previous time for the client when the client requests copy-content use-expiration date setting processing, and if the move-processing execution timing Tv is before the use-expiration date setting processing timing Tr of the copy content executed the previous time, the server performs permission processing of a new use-expiration date setting of the copy content stored in the client without transmitting the content-ID list to the client.

Furthermore, in a further embodiment of the present invention, the server performs notification processing of a content-invalidation request with a content-ID of content to be subjected to move processing to the client and generates and holds a moved list relating a client-ID of a notification-incapable client to a content-ID of move content when performing move processing of the stored content, the server generates a deletion-content-ID list storing the content-ID recorded in the moved list corresponding to the client and sends the list to the client when the client requests the copy-content use-expiration date setting processing, the client performs invalidation processing of the copy content corresponding to the content-ID included in the deletion-content-ID list out of the copy content stored in that client, and the client performs update processing of use-expiration date of the copy content corresponding to the content-ID not included in the deletion-content-ID list out of the copy content stored in that client.

According to still a further embodiment of the present invention, there is provided a method of information processing in a server for storing content and supplying copy content to a client, the method including the steps of: receiving a copy-content use-expiration-date request from the client; generating at least either a content-ID list storing content-IDs corresponding to content for which use-expiration-date updating is permitted out of-the copy-content stored in the client or a content-ID list storing content-IDs corresponding to content for which use-expiration-date updating is not permitted, for transmission to the client; and transmitting the content-ID list to the client.

Moreover, in a still further embodiment of the present invention, the method further including the steps of: performing confirmation processing of the existence of the client in a private-use range; and executing transmission of the content-ID list to the client on the condition of having received the confirmation.

Moreover, in a still further embodiment of the present invention, the confirmation processing of the existence of the client in a private-use range is performed as round-trip-time (RTT) check processing.

Moreover, in a still further embodiment of the present invention, the method further including the steps of performing notification processing of a content-invalidation request with a content-ID of content to be subjected to move processing to the client when performing move processing of the stored content.

Moreover, in a still further embodiment of the present invention, the method further including the steps of: holding move-processing-execution timing Tv when performing move-processing of the stored content, executing comparison between the move-processing execution timing Tv and the copy-content use-expiration date setting processing timing Tr executed a previous time for the client when the client requests copy-content use-expiration date setting processing, and if the move-processing execution timing Tv is before the use-expiration date setting processing timing Tr of the copy content executed the previous time, performing permission processing of a new use-expiration date of the copy content stored in the client.

Moreover, in a still further embodiment of the present invention, the method further including: performing notification processing of a content-invalidation request with a content-ID of content to be subjected to move processing to the client and generating and holding a moved list relating a client-ID of a notification-incapable client to a content-ID of the move content when performing move processing of the stored content; and generating a deletion-content-ID list storing the content-ID recorded in the moved list corresponding to the client and sending the list to the client when the client requests the copy content use-expiration date setting-processing.

According to still a further embodiment of the present invention, there is provided a method of information processing in a client for receiving and storing copy content of content stored in a server, the method including the steps of: storing a content-ID and use-expiration date information corresponding to the copy content received from the server in relation to each other; and selectively performing update processing of a use-expiration date of the copy content stored in that client or invalidation processing of the copy content stored in that client based on the content-ID list received from the server.

Furthermore, in a still further embodiment of the present invention, the method further including: when using copy content, comparing a current timer value obtained from a timer and the use-expiration date information and executing content-use processing on the condition that the current timer value is smaller than the use-expiration date of the copy content to be used.

Furthermore, in a still further embodiment of the present invention, the method further including: when the content-ID list received from the server is a content-ID list storing content-IDs corresponding to content for which use-expiration-date updating is permitted, performing update processing of use-expiration date of the copy content corresponding to content-ID included in the content-ID list out of the copy content stored in that client; and performing invalidation processing of the copy content corresponding to content-ID not included in the content-ID list out of the copy content stored in that client.

Furthermore, in a still further embodiment of the present invention, the method further including: when the content-ID list received from the server is a content-ID list storing content-IDS corresponding to content for which use-expiration-date updating is not permitted, performing invalidation processing of the copy content corresponding to a content-ID included in the content-ID list out of the copy content stored in that client; and performing update processing of a use-expiration date of the copy content corresponding to a content-ID not included in the content-ID list out of the copy content stored in that client.

According to still a further embodiment of the present invention, there is provided a computer program for causing a server for storing content and supplying copy content to a client to execute a method including the steps of: receiving a copy-content use-expiration-date request from the client; generating at least either a content-ID list storing content-IDs corresponding to content for which use-expiration-date updating is permitted out of the copy-content stored in the client or a content-ID list storing content-IDs corresponding to content for which use-expiration-date updating is not permitted, for transmission to the client; and transmitting the content-ID list to the client.

According to still a further embodiment of the present invention, there is provided a computer program for causing a client for receiving and storing copy content of content stored in a server to execute a method comprising the steps of: storing a content-ID and use-expiration date information corresponding to the copy content received from the server in relation to each other; and selectively performing update processing of a use-expiration date out of the copy content stored in that client or invalidation processing of the copy content stored in that client based on the content-ID list received from the server.

According to the configuration of an embodiment of the present invention, in the configuration in which content stored in a server is copied to a client such as a portable device, a copy-content use-expiration date is set, the client manages the content-ID and the use-available period in relation to each other, the client receives a content-ID list transmitted from the server when setting the use-expiration date, the client determines whether the copy content is a use-available period update permitted content or a use-available period update not permitted content, the client performs the use-available period update only for the update-permitted content and invalidates (deletes) the update-not-permitted content. Accordingly, strict use management of copy content based on a use-expiration date is realized. Also, it becomes unnecessary to set a restriction of the number of copies for each content as is done so far, and thus the degree of freedom increases for a user in a private use of content.

Also, according to the configuration of another embodiment of the present invention, a server verifies that a client is within a private-use range by, for example an RTT check, etc., and update processing of the content use-expiration date is performed after confirming that the client is within the private-use range by the verification. Accordingly, it becomes possible to prevent an illegal use of copy content outside of the private-use range.

Furthermore, according to the configuration of a further embodiment of the present invention, when a server has moved content, the server requests clients to delete the copy content corresponding to the moved content. If a client is incapable of communication at the move time, the server requests the client to invalidate the content based on a content-ID list at the time of next use-expiration date setting processing. Accordingly, the copy content corresponding to the content not stored in the server is prevented from remaining in the client for a long period of time.

Moreover, according to the configuration of a still further embodiment of the present invention, a server holds timing when move processing has been performed, the server compares it with the previous use-expiration date setting request timing. If the move processing is not performed after the previous use-expiration date setting request timing, the server omits the creation and the transmission of the ID list and allows to reset the use-expiration date of the copy content stored in the client. Accordingly, the processing load is reduced and the efficiency of the data processing is increased.

In this regard, the computer program according to the present invention is, for example, a computer program which can be supplied to a computer system capable of executing various program codes, in a computer-readable format, by a recording medium such as a compact disc (CD), a floppy disk (FD), a magneto-optical disc (MO), etc., or a communication medium such as a network, etc. By supplying such a program in a computer-readable format, the processing in accordance with the program is performed by a computer system.

Other and further objects, features and advantages of the present invention will become apparent from the detailed description based on the following embodiments of the present invention and accompanying drawings. In this regard, a system in this specification means a logical set of a plurality of devices, and each device is not necessarily contained in the same case.

BRIEF DESCRIPTION OF THE DRAWINGS

FIG. 9 is an explanatory diagram of a specific example of a content-ID list and a device certificate to be transmitted from a client to a server;

FIG. 10 is an explanatory diagram of a configuration for generating a newly created content-ID list to be transmitted to a client;

FIG. 11 is a flowchart for explaining execution-timing information recording processing when move processing is performed in a server;

FIG. 16 is a diagram showing an example of the data structures of a deletion-content-ID list and a device certificate.

DESCRIPTION OF THE PREFERRED EMBODIMENTS

In the following, a detailed description will be given of a server/client system, an information processing unit, an information processing method, and a computer program with reference to the drawings.

Figure 1:
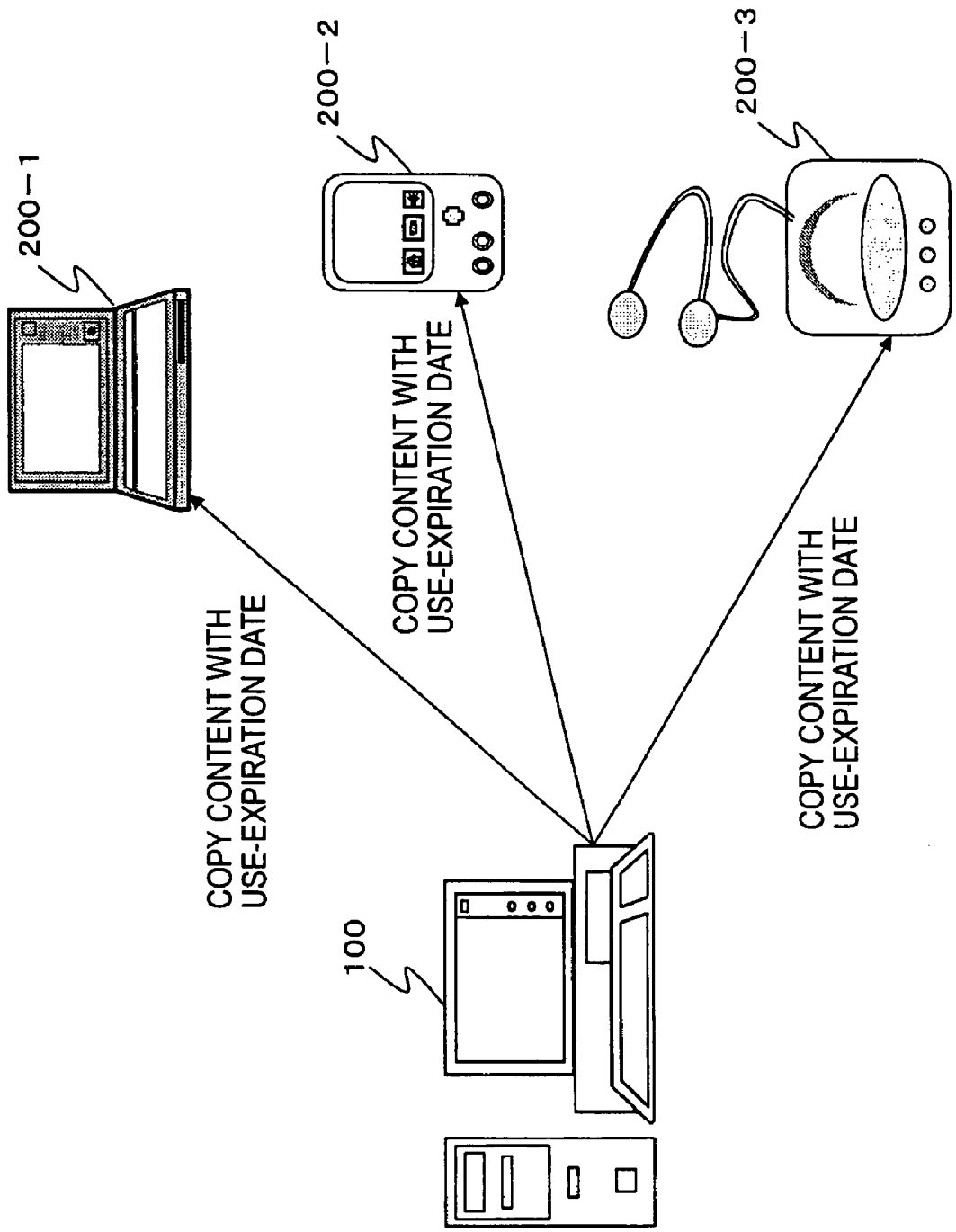
FIG. 1 is a diagram illustrating an example of the configuration of a system to which the present invention can be applied.

First, referring to FIG. 1, a description will be given of an example of a content-use configuration to which the present invention has been applied. In FIG. 1, there are shown a server 100 which executes processing in response to various processing requests, such as a content-acquisition request from a client, and clients 200-1 to 200-3 which receive a copy of content stored in the server 100.

The server 100 is an information processing unit, such as a PC, which stores content in a recording medium such as a DVD, a hard disk, etc. The server 100 stores content which is copyright protected. The clients 200-1 to 200-3 are information processing units which receive a copy of the content stored in the server 100 through a cable such as an USB cable, etc., or through a network such as a LAN, etc., from the server 100, record the copy in a recording medium possessed by the client 200 such as a flash memory, a DVD, a hard disk, etc., and play back the recorded copy of the content.

In FIG. 1, one server and three clients are shown. However, there may be two servers or more which store content, and there may be other devices as clients. In this regard, the content stored in the server includes content that is copyright protected and that is permitted to be copied only for private use. However, in the configuration of this invention, a use-expiration date is set in the copy of the content, the details of which will be described below. The client 200 is capable of using a copy of the content not later than the use-expiration date. A description will be given of the specific control configuration below.

Figure 2:
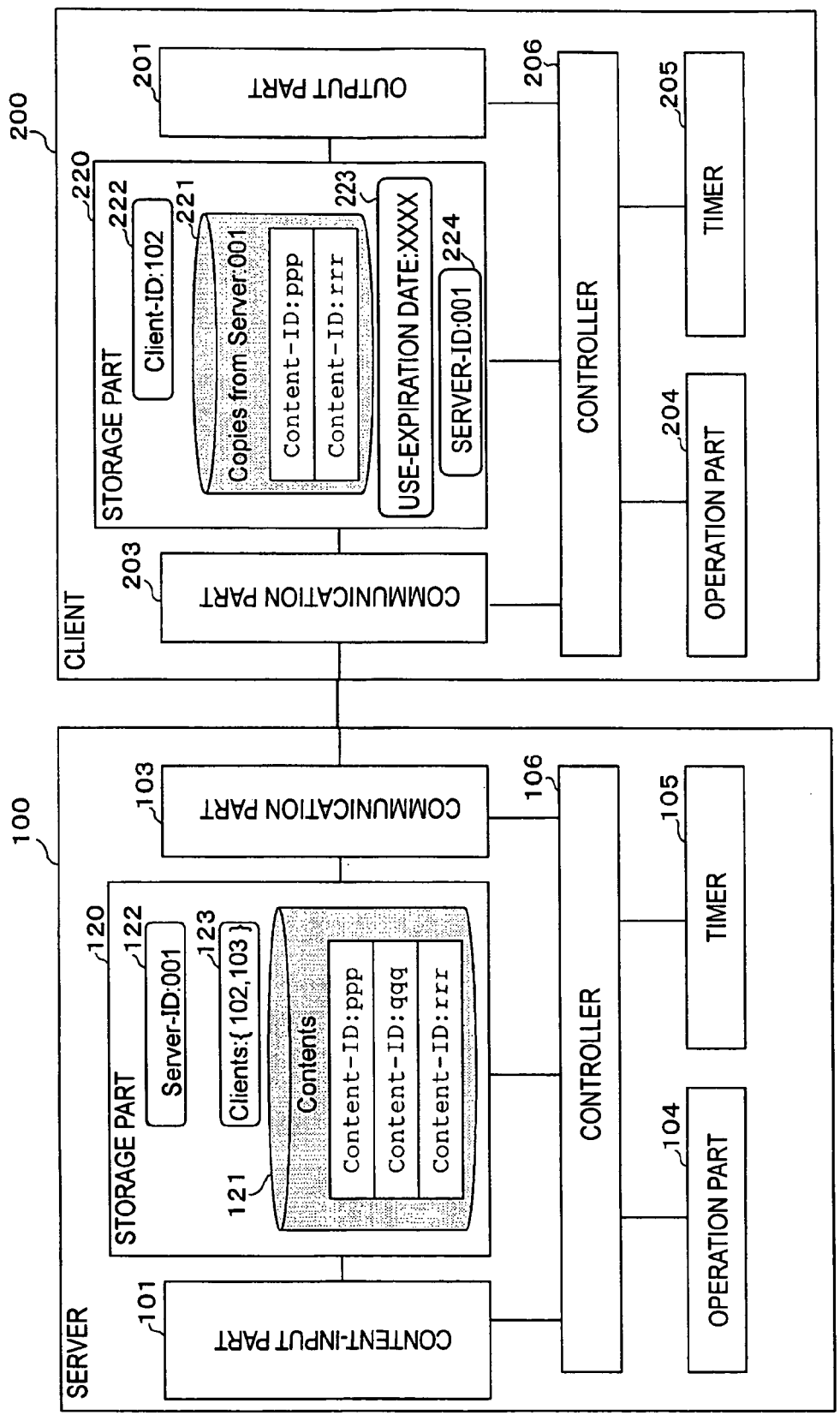
FIG. 2 is an explanatory diagram of the configurations of a server and a client.

FIG. 2 shows the configurations of the server 100 for storing content and the client 200 for storing a copy of the content stored in the server.

The server 100 includes a content-input part 101, a storage part 120, a communication part 103, an operation part 104, a timer 105, and a controller 106. The content-input part 101 receives content through broadcasting, communication, a recording medium, etc. The storage part 120 stores captured content 121 through the content-input part 101.

The storage part 120 stores a server-ID 122 as identification information of the server 100, a client-ID 123 registered as a supply destination and communication recipient of a copy of the content, and a computer program executed in the controller 106, in addition to the content 121. The communication part 103 sends and receives various data, such as content and other information stored in the storage part 120, program commands to be executed, etc., to and from the client 200.

The operation part 104 includes components such as a display unit and an input key, which constitute an interface for user operations, and executes data input from the user and data-presentation processing to the user. The timer 105 executes timing control, when the server supplies content to a client 200, for performing an RTT (Round Trip Time) check to be executed as a locality check in order to confirm that the client is within, a private-use range of the content, or for passing the timer information of the server to the client. The controller 106 performs the control of each component described above and the control of information exchange between individual components.

The client 200 includes an output part 201, a storage part 220, a communication part 203, an operation part 204, a timer 205, and a controller 206. The storage part 220 stores copy content 221 obtained from the server 100, a client-ID 222 as client-identification information, use-expiration date information 223 of the copy content 221, and further a server-ID 224 as server-identification information from which the content has been obtained. Furthermore, although not shown in the figure, the storage part 220 stores a computer program to be executed in the controller 206.

The output part 201 is a part for outputting the content stored in the storage part 220 as video and sound, and includes a display unit, a speaker, etc. The timer 205 measures time for controlling the use-expiration date of the copy content obtained from the server based on the use-expiration date information 223.

The communication part 203 performs communication with the server 100, and performs transmission/receiving processing to/from the server 100 on various data, such as content and other information, program commands to be executed, etc. The operation part 204 includes components such as a display unit and an input key, which constitute an interface for user operations, and executes data input from the user and data-presentation processing to the user. The controller 206 performs control of each component described above and control of information exchange between individual components.

A server-ID 122 stored in the server 100 is a unique server-ID which can be identified from the other devices. A content-ID which is unique at least to the server is assigned to content stored in the server 100. The client-ID 222 stored in the client 200 is also a unique client-ID which can be identified from the other devices.

In the following, a description will be given of the details of various processing executed between the server and the client with reference to flowcharts. A description will be given of each of the following processing in sequence.

Figure 3:
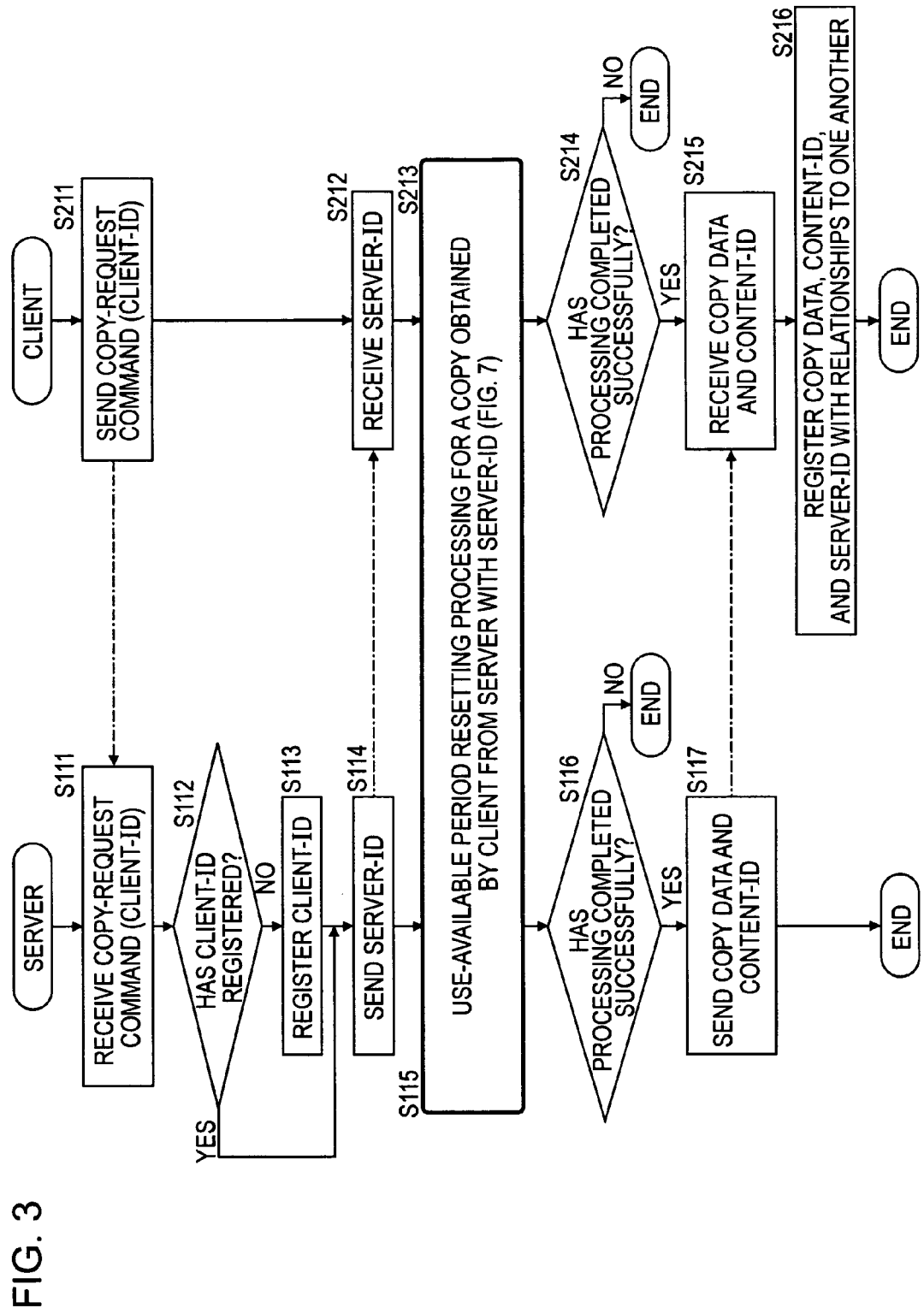
FIG. 3 is a flowchart for explaining the processing procedure when a server passes a copy of content to a client.

(1) Content-supply processing from the server to the client
(2) Content-playback processing in the client
(3) Copy-content invalidation processing following content-move processing,
(4) Copy-content use-available period setting processing
(5) Copy-content use-available period setting processing to which move-processing execution timing information is applied
(6) Processing to which a moved-content-ID list is applied (1) Content-Supply Processing from the Server to the Client FIG. 3 is a flowchart for explaining the processing procedure when a server passes copy content to a client. The client receives copy content stored in the storage part of the server, such as a hard disk, and stores it in the storage part of the client.

The communication between the server and the client is performed by, for example, using UPnP (a registered trademark), which is known as a protocol constituting a home network. UPnP makes it possible to construct a network easily without a complicated operation, and it is possible to perform a content-supply service without difficult operations and settings among the devices connected to a network. Also, UPnP is independent of the operating system (OS), and has the advantage of being able to add devices easily. For example, if a client and a server comply with UPnP, the client can find the server, and then identify the description of the content possessed by the server and the content itself.

In UPnP, two-way authentication is performed between the devices connected to a network by exchanging definition files described in an XML (extensible Markup Language) format. The summary of the UPnP processing is as follows.

(1) Addressing processing: Obtains a device-ID of the device itself, such as an IP address.
(2) Discovery processing: Searches each device on the network, and obtains information such as a device type, function, etc., included in the response received from each device.
(3) Service-request processing: Requests a service from each device based on the information obtained by the discovery processing.

It becomes possible for a device to supply and receive services provided by the devices connected to a network by performing the above-described processing procedure. A device newly connected to a network obtains a device-ID by the addressing processing, obtains information of the other devices connected to the network by the discovery processing, and is thus able to request services.

FIG. 3 is a flowchart for explaining the subsequent processing when a client obtains information on content stored in a server and requests a copy of a specific piece of content based on this information. In step 211, the client sends content-specification information, such as a content-ID specifying the content to be received, and the client-ID of that client to the server. When receiving the content-copy request and the client-ID from the client in step S111, the server determines whether or not the client-ID of that client has been registered in the storage part (see FIG. 2) in step S112. If unregistered, the server registers and stores it into the storage part in step S113.

When the confirmation of the registration of the client-ID or the registration processing has been completed, next, the server sends the server-ID of that server to the client in step S114. In step S212, the client receives the server-ID from the server.

Next, in steps S115 and S213, use-available period setting processing for the copy content supplied from the server to the client is performed between the server and the client. In this regard, when the client has already stored the copy content obtained from the server, use-available period resetting processing is performed on the obtained copy content. A detailed description will be given of the use-available period setting processing for the copy content below. In this regard, in this processing, use-available periods of all the copies obtained from that server are updated to a predetermined period, including newly obtained copy content, that is to say, the setting (reset) processing of a new use period is performed.

In this regard, the server performs confirmation processing of whether the server and the client are in the same private-use range as an execution condition of the use-available period setting processing. The confirmation processing is RTT (Round Trip Time) check processing, in which a communication packet is sent to a client and the time period for the packet to return to the server is measured. If RTT is measured to be within a predetermined threshold time period, it is determined that the server and the client are in the same private-use range. The server permits the client to perform the update processing of the use-available period of the copy content only when this condition is satisfied. The details of the processing will be described later.

Figure 4:
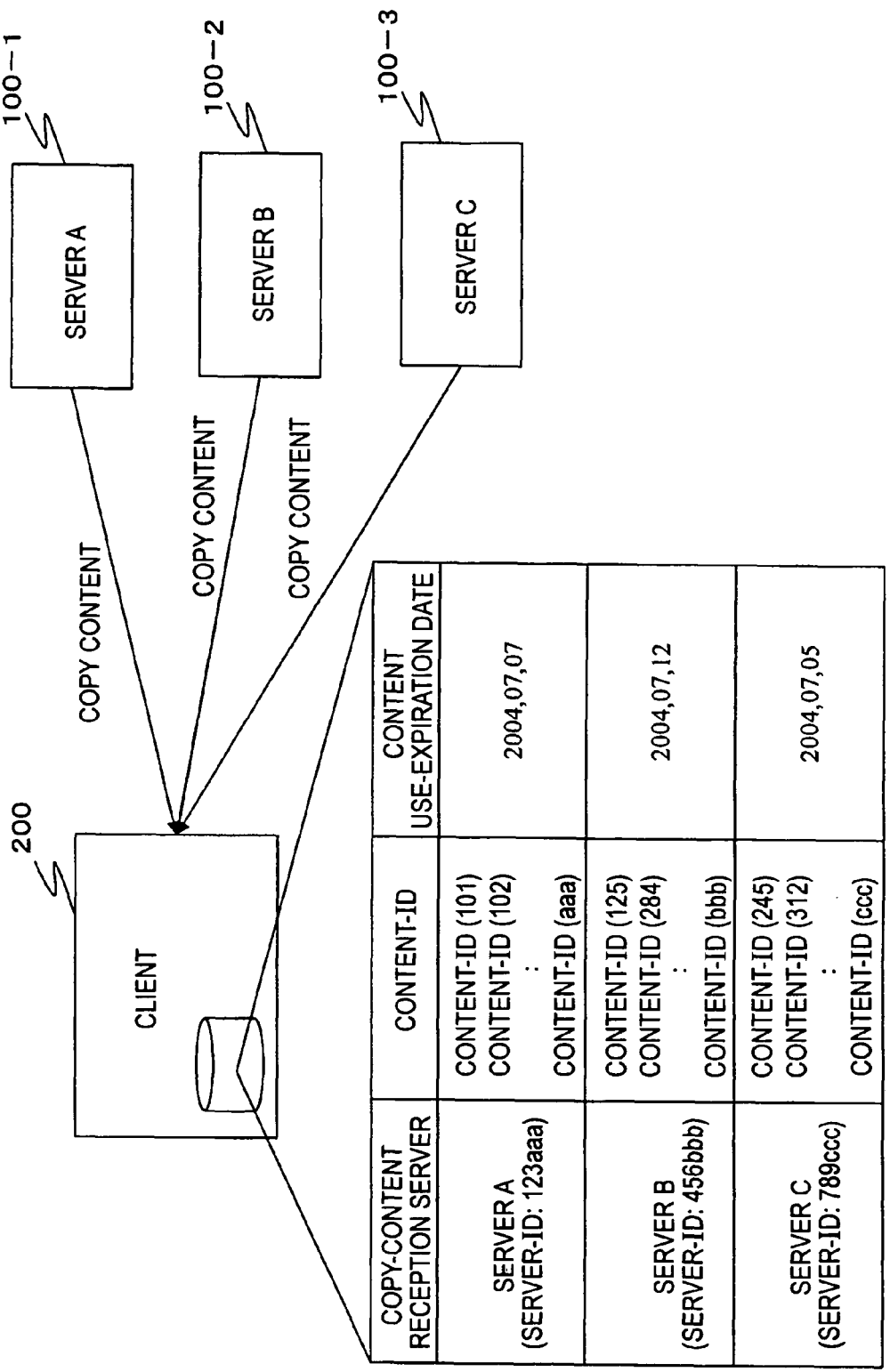
FIG. 4 is an explanatory diagram of a control configuration in which use-expiration dates for obtained content is set by a client.

In this regard, the client considers the obtained content as a set of content for each server and sets one use-expiration date for each set of the content. As shown in FIG. 4, the client 200 is capable of obtaining copies of various content from a plurality of different servers and storing them into the storage parts of that client. In FIG. 4, three servers, that is, a server A 100-1, a server B 100-2, and a server C 100-3, are shown. After obtaining individual copy content from these servers, the client 200 sets a content-ID list for each server, as shown in the figure, and sets a use-expiration date for each set of content with respect to each server. A description will be given of setting processing of content use-expiration dates later.

Referring back to FIG. 3, the description of the copy-content acquisition processing sequence will be continued. If the setting processing of a copy-content use-available period of steps S115 and S213 shown in FIG. 3 has been successful (Yes in steps S116 and S214), the server sends the copy data of the content requested from the client and the content-ID assigned to that content to the client in step S117. In this regard, if the setting processing of a copy-content use-available period of steps S115 and S213 has failed (No in steps S116 and S214), the transmission processing of the copy content thereafter is not executed, the use-expiration date of the copy content that has been obtained by the client is not updated, and the processing is terminated.

When the copy-content use-available period setting processing of steps S115 and S213 has been successful (Yes in steps S116 and S214), the client receives the copy content and the content-ID assigned to that content from the server in step S215. In step S216, the client records the received copy-content data in relation to the content-ID, the server-ID, and the content use-expiration information. Specifically, processing is performed to manage all the copy content obtained from the same server as described with reference to FIG. 4.

In this regard, as described with reference to FIG. 2, a client has the timer 205. When the client performs content-playback processing, the client verifies the expiration date set in the copy content obtained from the server using the timer function of the timer. Only if the content is within the use-expiration date does playback becomes possible. This is a measure for preventing a client storing copy content from using that content outside of a private-use range.

As described with reference to FIG. 3, when new copy content is received from the server, a use-expiration date of that copy content is reset together with the copy content that has been previously received from the server, and thus a new use-available period is set. When the use-available period is reset, a confirmation is made that the client and the server are in the same private-use range by an RTT check, etc., as described above. A new use-available period is started after the confirmation of the RTT check. The timer 205 of the client starts measuring time from the point in time of the confirmation of the RTT check. For example, when a use-available period of one week is set as a new use-available period for a set of content obtained from the server A in the use-expiration date setting or resetting processing, if a confirmation is made that the client and the server are located within a certain communication distance by the RTT check, and it is confirmed that the client is in a private-use range, a new content use-expiration date is set and the timer 205 of the client starts measuring time.

A description will now be given with reference to FIG. 2. When obtaining a timer value at the time of a successful RTT check from the timer 205, the controller 206 of the client 200 adds a value corresponding to a predetermined use-available period to the obtained timer value and stores the result into the storage part 220 as use-expiration date information 223. In this regard, the timer 205 is assumed to be continuously counting the timer value. In this regard, the use-expiration date information is set by the client and is managed by the client. However, when the RTT check of the use-expiration date-information is successful, the server may inform the client, and the client may store this notification information into the storage part 220 of the client 200 as the use-expiration date information.

In this regard, if it is confirmed that the client is in the same private-use range as the server storing the original content of the copy stored in the client, the client can reset the use-available period to the initial value each time. However, the client is assumed to be registered in the server.

(2) Content-Playback Processing by Client

Figure 5:
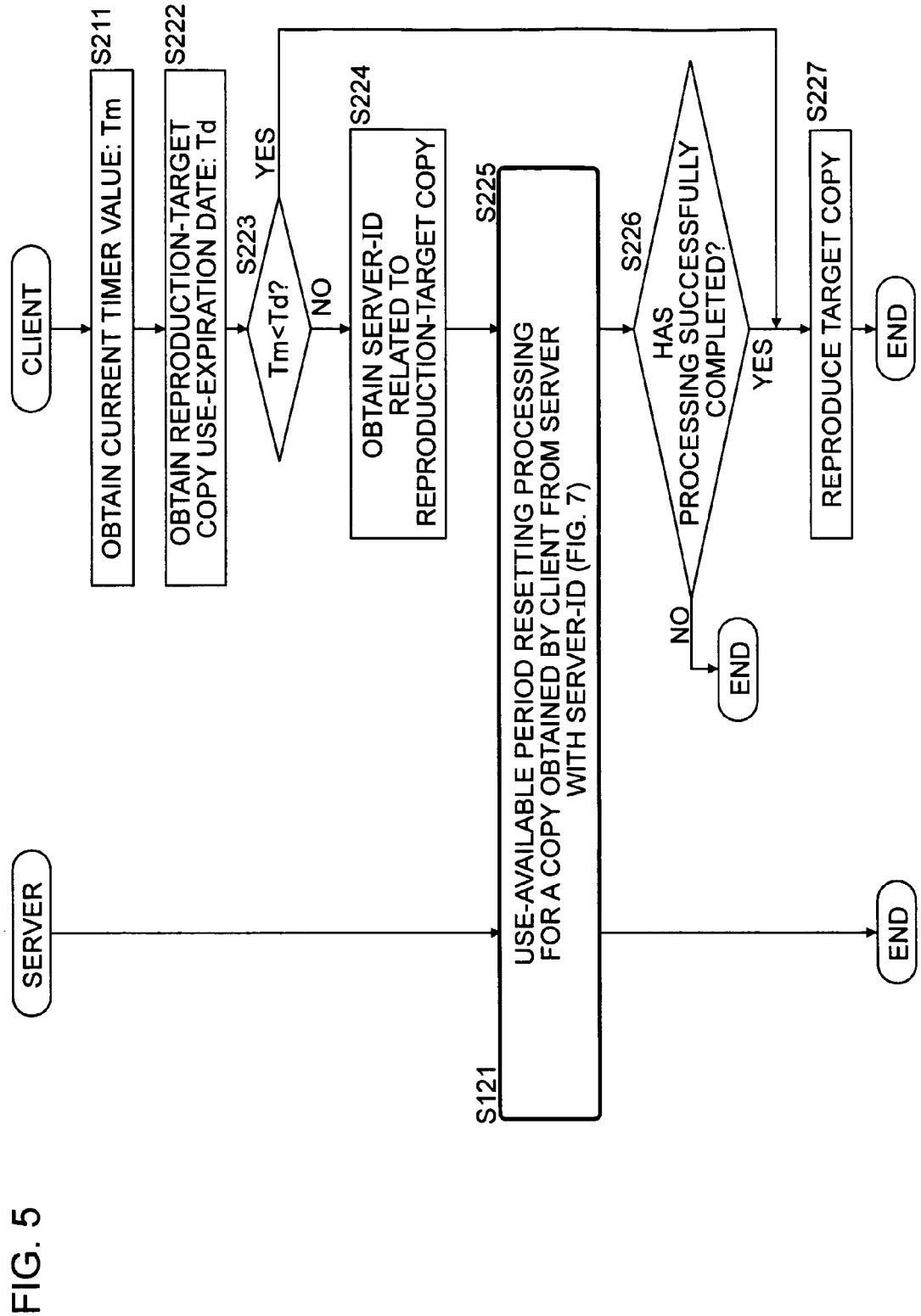
FIG. 5 is a flowchart for explaining the procedure for a client to reproduce a copy of content received from a server.

FIG. 5 is a flowchart for explaining the procedure for a client to playback a copy of content received from a server. The client checks whether or not a use-expiration date has passed at a point in time when reproduction of copy content commences. If the expiration data has passed, the client does not play back the content. However, at this time, an attempt may be made to extend the use-expiration date. If the attempt is successful, the playback may be performed. A description will be given of each step.

The client obtains a timer value Tm as the measured time of the timer 205 in step S221. Next, in step S222, the client obtains the use-expiration date Td, which is set corresponding to the copy content to be reproduced. In this regard, the timer value Tm, as the measured time of the timer 205, and the use-expiration date Td may be absolute date and hour information such as 23:59:59, Jul. 7, 2004, or the elapsed time information from the successful RTT check time described above.

In step S223, a determination is made as to whether or not the following expression is satisfied:

measured timer value (Tm)<use-expiration date (Td).

If it is satisfied (Yes in step S223), the present time has not yet passed the use-expiration date corresponding to the content, and thus the processing proceeds to step S227 to perform content-playback processing.

If the following expression is not satisfied (No in step S223), the present time has passed the use-expiration date corresponding to the content:

measured timer value (Tm)<use-expiration date (Td).

Thus, resetting of the use-expiration date is performed in steps S224 and S225. First, in step S224, the client obtains the server-ID of the server, from which the content to be used is obtained, from the storage part 220 (FIG. 2). Next, in step S121, S225, the use-available periods of all the copies obtained from that server are updated to a predetermined period, that is to say, resetting processing of a new use-available period is performed.

In this regard, the server performs RTT (Round Trip Time) check processing as described above as an execution condition of the use-available period setting processing to confirm that the client and the server are in the same private-use range. If RTT is measured to be within a predetermined threshold time period, it is determined that the server and the client are in the same private-use range. Only when this condition is satisfied does the server permit the client to perform the update processing of the use-available period of the copy content. The details of this processing will be described later.

If the copy-content use-available period setting processing in step S225 is successful (Yes in step S226), the processing proceeds to step S227 and the content-playback processing is performed. In this regard, if the copy-content use-available period setting processing in step S225 fails (No in step 5226), the playback processing of the copy content is not executed, and the processing is terminated.

Figure 7:
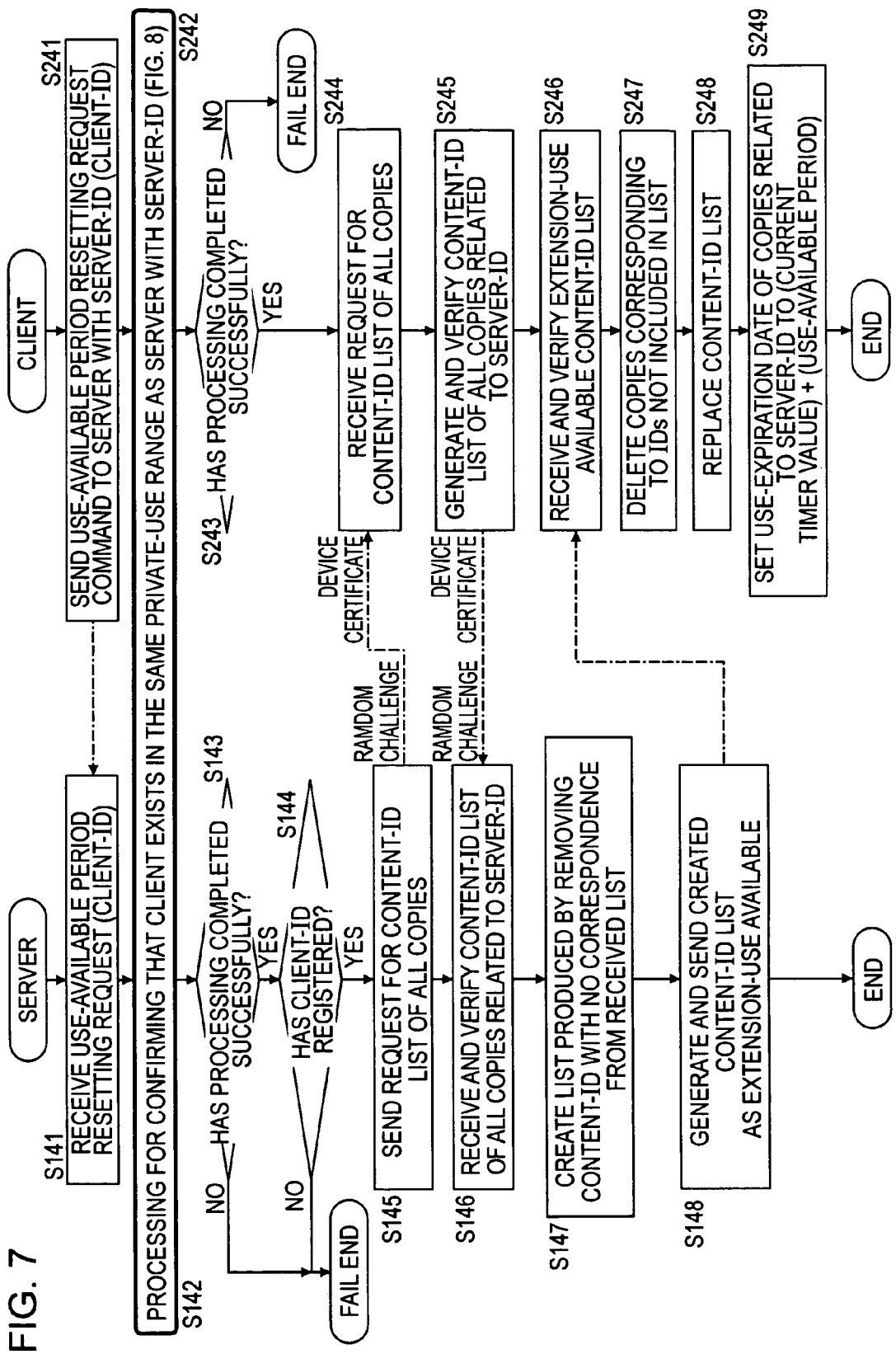
FIG. 7 is a flowchart for explaining the details of use-available period setting processing of content supplied from a server to a client.

A description has been given, with reference to the processing flowchart shown in FIG. 5, of an example in which the content to be reproduced is selected, and then a determination is made as to whether or not it is within the use-expiration date. However, the client can maintain a state in which the copy is set to use-available by appropriately confirming that it is within a private-use range before the use-expiration date. Specifically, resetting processing can be automatically executed at regular periods, or when the information processing unit, such as a portable device, etc., storing the copy content is recharged. For example, the use-available period setting processing to be described with reference to FIG. 7 is performed when a predetermined period of time measured by the timer has passed, or triggered by being recharged.

(3) Copy-Content Invalidation Processing Caused by Content-Move Processing

The content in the server do not constantly exist in the server. For example, when content is written into a medium such as a DVD, there is a possibility that it becomes necessary to be deleted from the server. The processing to move the content in the server to another device or to a medium is called "move" of the content. The move is the movement of the original content, and thus the content of the movement source should be deleted. This is because if copy content is created in a plurality of DVDs and these copy content do not include an expiration date as described above, the copy content might be used widely out of the private-use range.

When content is moved to a recording medium such as a DVD from the server, the original content, on which the copy content supplied by the server to the client is based, is deleted. The recording medium of the content move destination is easier for use outside of the private-use range than the client itself. Also, when considering the management burden by the server for managing the copies of the content not stored in the server, it is effective to invalidate all the copy content supplied from the server to the client before the move processing when the move processing is executed from the viewpoint of protecting illegal uses.

Figure 6:
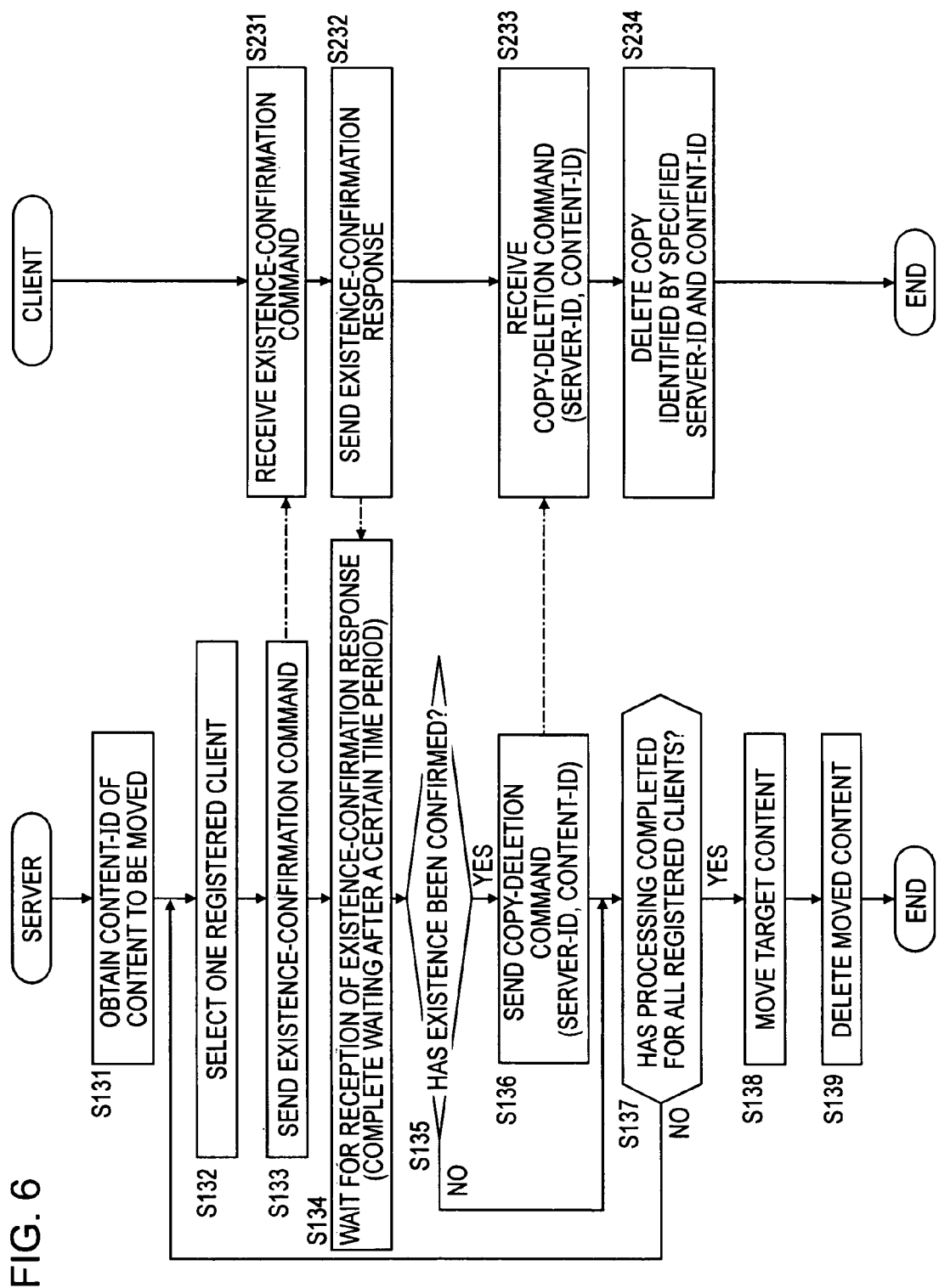
FIG. 6 is a flowchart for explaining move processing of content in a server and a sequence for executing invalidation processing of a copy of the content supplied to a client.

A description will be given of a specific sequence of the invalidation processing of copy content that has been supplied to a client when the server executes move processing of content with reference to the flowchart in FIG. 6. The outline of this processing is as follows. The server sends the content-ID of the content to be moved and the server-ID of that server to all the clients that are capable of communication and are registered. The client performs the invalidation processing of the copy content corresponding to the received content-IDs. Thereafter, the server performs content-move processing and deletes the content from the server.

A description will be given of each step of the flowchart shown in FIG. 6. In step S131, the server obtains the content-ID of the content to be moved from the storage part. Next, in step S132, the server selects the clients that have been registered as the copy-content supplied clients, that is to say, selects the client-ID. In step S133, the server sends an existence-confirmation command to the selected clients.

In step S231, when a client has received the existence-confirmation command from the server, the client sends a existence-confirmation response to the server in step S232. If the server receives the response to confirm the existence of the client (Yes in step S135) in a reception-waiting state of the existence-confirmation response in a predetermined time period in step S134, the server sends a copy-deletion command including the content-ID corresponding to the content to be moved and the server-ID in step S136. If the existence of the client is not confirmed (No in step S135), the processing of step S136 is omitted.

When the client receives the copy-deletion command, the client reads the server-ID and the content-ID included in the copy-deletion command in step S233, and performs deletion processing of the copy-content corresponding to the content-ID in step S234.

In step S137, the server determines whether or not the processing for all the registered clients has been completed. If not completed, the processing returns to step S132, selects another registered client, and the same processing is repeated. If it is confirmed that the processing for all the registered clients has been completed in step S137, the processing proceed to step S138, the move processing of the content to be moved, that is to say, the processing to move the content to another recording medium or another device is performed, and the move content is deleted from the server in step S139. In this regard, the move processing including the processing in steps S138 and S139 is completed.

In this regard, in the flowchart described with reference to FIG. 6, only the client which has responded to the existence-confirmation command from the server performs the deletion of the copy content. However, for example, if the client is a portable device, the client is not necessarily capable of receiving the existence-confirmation command from the server. In such a case, the copy content remains in the client that has failed the communication with the server in the case of the execution of the processing in FIG. 6. However, the invalidation processing of the use of the copy content is also necessary in such a client after a predetermined period.

Specifically, in the copy-content use-available period setting processing, which is described below with reference to FIG. 7, resetting the use-available period is not performed for the moved content, but the moved content is deleted.

(4) Next, a description will be given of the details of the use-available period setting processing of the copy content supplied or to be supplied from the server to the client with reference to FIG. 7. In this processing, when confirmation is made that the client and the server are in the same private-use range to set the copy-content use-available period, the client sends the content-ID list of all the stored copies to the server, the server returns only the content-IDs of the content existent in the server from that list, and the client performs the invalidation of the copies not included in the returned ID list and performs the update of the content-ID list. By this processing, the copy content corresponding to the content that have moved in the server are invalidated (deleted) without resetting their use-available periods. A new use-available period is set only in the copy content corresponding to the content stored in the server.

A description will be given of each step of the flowchart shown in FIG. 7. First, in step S241, the client sends a copy-content use-available period reset request command to the server corresponding to server-ID stored in the storage part 220 (see FIG. 2) of the client, that is to say, the copy-content reception server. The client-ID is added to this send command.

The server receives the copy-content use-available period reset request command from the client in step S141, and obtains the client-ID added in the command. Next, in step S142, S242, determination processing on whether or not the client and the server are in the same private-use range is performed.

The details of the processing will be described with reference to FIG. 8. The processing is RTT (Round Trip Time) check processing in which a communication packet is sent to a client and the, time period for the packet to return to the server is measured. If RTT is measured to be within a predetermined threshold time period, it is determined that the server and the client are in the same private-use range.

A description will be given of each step of the flowchart shown in FIG. 8. In step S151, the server sends an RTT command to the clients to be the target of the private-use range existence confirmation, and obtains the current timer value: Ts in step S152.

In step S251, the client receives the RTT command from the server, and sends an RTT response to the server in step S252. The server receives the RTT response from the client in step S153, and obtains the timer value: Te at response reception time in step S154.

Next, in step S155, the server compares the elapsed time from the RTT transmission to the RTT response reception: Te−Ts and a predetermined limit value (limit time).

If Te−Ts≦limit value (Yes in step S155), the comparison processing is determined to be successful in step S156, that is to say, the client is determined to be at relatively near location, that is, within a private-use range. If the above expression does not hold (No in step S155), the comparison processing is determined to have failed in step S157, that is to say, the client is determined not to be within the private-use range. In step S158, the server informs the client of the RTT measurement result. The client receives the RTT check result in step S253.

Referring back to FIG. 7, a description will be continued of the copy-content use-available period setting processing sequence. In step S142, S242, the private-use range verification by the RTT check described with reference to FIG. 8 is performed, and both the server and the client determine the result of the RTT check (steps S143 and S243). If the RTT check fails, that is to say, if the client is determined to be outside of the private-use range, the subsequent processing is not performed, and the processing is terminated. That is to say, the use-expiration date reset of the copy-content stored by the client is not performed.

If the RTT check is successful, that is to say, if the client is determined to be within of the private-use range, the server determines whether or not the client-ID has been registered in step S144. The matching is performed between the client-ID added to the use-available period reset request command received from the client in step S141 and the client-ID stored in the storage part 120 (see FIG. 2) in the server. If the client-ID has not been registered, the subsequent processing is not performed, and the processing is terminated.

If the client-ID has been registered, the processing proceeds to step S145, and the server requests the client to send the list of the content-IDs corresponding to the copy content stored by the client. In this regard, when the server sends this request to the client, the server sends a random challenge and a device certificate (public-key certificate) held by the server to the client as data to be applied in order to secure safety and validity of the content-ID list transferred between the server and the client.

In step S244, the client receives a request of the content-ID list together with the random challenge and the device certificate. In step S245, the client generates a list including content-IDs of the copy content corresponding to the server-ID of the server that has received the content, which has been the update request target of the use period, and sends the list to the server. When sending this list, the client sends the random challenge generated by the client and a device certificate (public-key certificate).

A specific example of the list of the content-IDs to be sent from the client to the server is shown in FIG. 9A. The list includes the following data:

List transmission source-ID (ID of source)=client-ID;
List transmission destination-ID (ID of destination) =server-ID;
Number of entries;
Content-ID;
Received random number from transmission destination (random challenge from destination)=random challenge obtained from a server; and
Transmission-source electronic signature (signature by source).

The transmission-source electronic signature is a signature produced, for example, by applying a private key supplied to each device in a public key cryptosystem to all the data in the list. At the reception side of the list, data validity is confirmed by the signature verification in which the public key corresponding to the private key is applied. In this regard, an electronic signature may be produced by the configuration of using MAC (message authentication code) obtained in the hash processing with key based on the random number exchanged with the private key which has been shared by the transmission source and transmission destination in advance.

FIG. 9B shows an example of the data structure of a device certificate (public key certificate) transmitted together with the list. The device certificate (public key certificate) includes the following data:

Device ID=client-ID;
Device Public Key; and
Electronic signature of the publisher (signature by LA).

The public key certificate shown in FIG. 9B has a general structure of a public key certificate, and includes a device-ID, a device public key, and an electronic signature of the publisher. For example, the server which has received the client-device device-key certificate storing the public key of the client performs verification based on the signature set in the received public key certificate. After confirming that the certificate has not been altered, the server obtains the stored public key of the client. The server can apply the obtained public key of the client, and apply the electronic signature set in the content-ID list shown in FIG. 9A, that is to say, apply the client private key to perform the verification of the generated signature.

In step S146 in FIG. 7, the server performs the verification of the content-ID list received from the client. The verification processing is performed in accordance with the processing described above. That is to say, the processing is executed in the following steps:

Verification of the public key certificate received from the client;
Acquisition of the public key from the public key certificate;
Verification of signature of the content-ID list to which the obtained public key is applied; and Acquisition of content-ID from the content-ID list.

If the verification fails in any step of the signature verification, that is to say, if a determination is made that the data has been altered, the processing is aborted.

If the signature verification is successful, and the data is determined not to have been altered, in step S147, the server performs the matching portion between the content-ID list received from the client and the content-ID corresponding to the content that the server stores in the storage part at the present time. The server generates a list produced by deleting the IDs corresponding to the content not stored in the server from the content-ID list received from the client.

A description will be given of an example of a specific processing with reference to FIG. 10. FIG. 10 shows a list 351 sent from a client, a content-ID list 352 corresponding to the content stored in the server, and a newly created list 353, which is newly created.

The list 351 sent from a client includes:
Content-ID (aaa)
Content-ID (bbb)
Content-ID (ccc).

The content-ID list 352 corresponding to the content stored in the server includes:
Content-ID (aaa)
Content-ID (bbb)
Content-ID (eee)
Content-ID (kkk).

The newly created list 353 is produced by removing the IDs not included in the content-ID list 352 corresponding to the content stored in the server from the list 351 sent from the client. In this setting, the ID which is included in the list 351 sent from the client, but not included in the content-ID list 352 corresponding to the content stored in the server is the content-ID (ccc).

The content corresponding to the content-ID corresponds to the content, etc., whose copy the server supplied to the client, and then the content has been deleted from the server by the move processing.

The newly created List 353 in this case includes only the content-ID (aaa) and the content-ID (bbb). That is to say, only the IDs included in the list 351 sent from the client and also included in the content-ID list 352 corresponding to the content stored in the server are selected to be produced as a newly created list 353.

Referring back to the flowchart in FIG. 7, a description will be continued of the sequence of the copy-content use-available period setting processing. In step S147, a newly created list described with reference to FIG. 10 is created, and then the created new list is sent to the client as the content-ID list corresponding to extension-available content in step S148. In this regard, the content-ID list to be sent from the server to the client at this time has the same structure as that described with reference to FIG. 9A before.

In step S246, the client performs the verification of the content-ID list received from the server. The verification processing is performed in the following steps:
Verification of the server-side public key certificate received from the server in step S244;
Acquisition of the :server public key from the server-side public key certificate;
Verification of signature of the received content-ID list by the obtained server public key; and
Acquisition of content-ID from the received content-ID list.

If the verification fails in any step of the signature verification, that is to say, if a determination is made that the data has been altered, the processing is aborted.

If the signature verification is successful, and the data is determined not to have been altered, in step S247, the client performs the deletion of the copy content corresponding to the content-IDs not included in the content-ID list received from the server.

Next, in step S248, the client performs replacement processing of the content-ID list. In this processing, the content-IDs corresponding to the copy content stored in the storage part of that client are replaced by the content-IDs included in the list received from the server.

As described before with reference to FIG. 4, the client records the copy-content-ID list received from each server in relation to the use-available period information thereof. The client performs update processing of the content-ID list stored in the storage part of that client so as to include only the content-IDs included in the content-ID list received from-the server.

Further, in step S249, the client performs the processing to set the use-expiration date related to the server-ID of the server which has performed the copy-content use-available period setting processing to a new use-expiration. The use-expiration date setting processing is performed by setting the use-expiration date calculated by the following expression, for example, use-expiration date=(current timer value)+(use-available period).

That is to say, a new use-available period set in one execution of the use-available period setting processing is set, for example, a week. When the use-available period setting processing is performed, one week is added to the setting value as a new use-available period. In this regard, an absolute date and time having a specific year, month, date, and time may be specified by the server and this may be set as the use-expiration date.

In the processing flowchart in FIG. 7, a description has been given of an example of the processing in which a newly created list to be sent from the server to the client is produced by extracting only IDs included both in the received list from the client and in the content stored in the server, and only the use-expiration dates of IDs included in the list received from the server are set and the IDs not included in the list are deleted from the client. However, a newly created list to be sent from the server to the client may include the IDs received list from the client and does not include the content stored in the server. In this case, the client performs deletion of the copy content corresponding to the content-IDs included in the newly created list received from the server, and resets the use-expiration date of the content corresponding to the content-IDs not included in the list.

(5) Copy-Content Use-Available Period Setting Processing to which Move-Processing Execution Timing Information is Applied Next, with reference to FIGS. 11 and 12, a description will be given of copy-content use-available period setting processing in which the server records the execution timing information of move processing, generates a newly created list only when necessary based on this recording information, and send the list to the client.

FIG. 11 is a flowchart for explaining execution-timing information recording processing when move processing is performed in the server. In step S151, S251, move processing is performed. This processing is the processing described with reference to FIG. 6 before. In the processing, a request of invalidation (deletion) processing of the copy-content corresponding to the moved content is made to the client capable of communication. Thereafter the content in the server are output to the external storage means or devices, and then the content is deleted from the storage part of the server.

When the move processing is completed, the server obtains the current timer value: Tv as move-processing execution timing information in step S152. In step S153, the server stores the timer value: Tv as move-processing execution timing information: Tv in the storage part.

Figure 12:
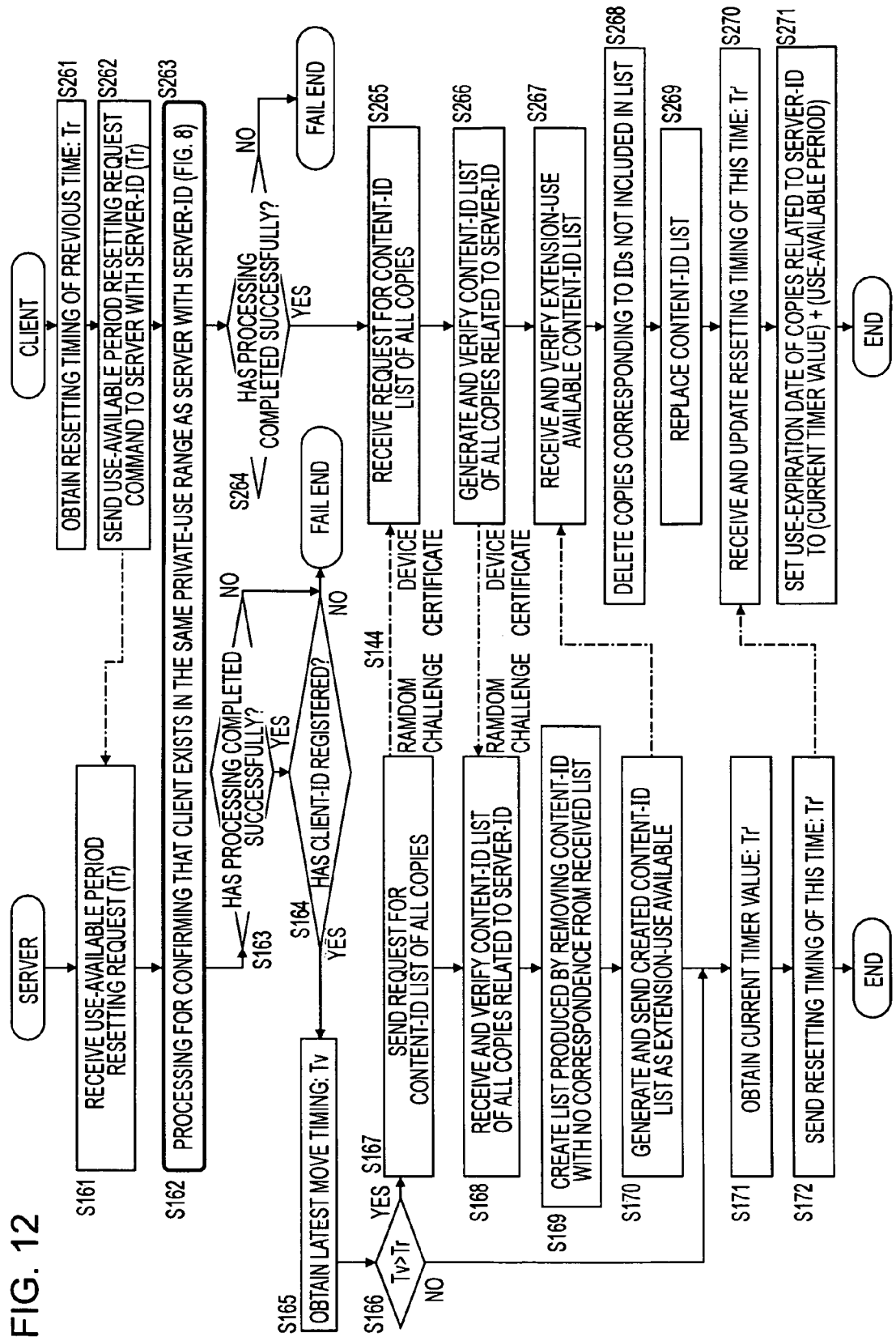
FIG. 12 is a flowchart for explaining a copy-content use-period setting processing sequence using a configuration in which a determination is made on whether or not generation and transmission of a newly created list are necessary by applying move-processing execution timing information: Tv, and the list is transmitted to a client only when necessary.

FIG. 12 is a flowchart for explaining a copy-content use-period setting processing sequence using a configuration in which a determination is made on whether or not generation and transmission of a newly created list are necessary by applying move-processing execution timing information: Tv, and the list is transmitted to a client only when necessary. A description will be given of each step of the flowchart shown in FIG. 12.

First, in step S261, the client obtains a copy-content use-expiration date setting processing timing Tr executed a previous time for the server corresponding to the content on which use-expiration date setting processing is to be executed this time from the storage part 220 of the client (see FIG. 2). The client obtains the processing timing at each execution of content use-expiration date setting processing, and stores it into the storage part (step S270).

Next, in step S242, the client sends a copy-content use-available period reset request command to the server corresponding to server-ID stored in the storage part 220 (see FIG. 2) of the client, that is to say, the copy-content reception server. The client-ID and the use-expiration date setting processing timing Tr executed a previous time, which is obtained in step S261, are added to this send command.

The server receives the copy-content use-available period reset request command from the client in step S161, and obtains the-client-ID added in the command. Next, in step S162, S263, determination processing on whether or not the client and the server are in the same private-use range is performed. The details of this processing is the same as the processing described with reference to FIG. 8 before. The processing is performed as RTT (Round Trip Time) check processing in which a communication packet is sent to a client and the time period for the packet to return to the server is measured. If RTT is measured to be within a predetermined threshold time period, it is determined that the server and the client are in the same private-use range.

Figure 8:
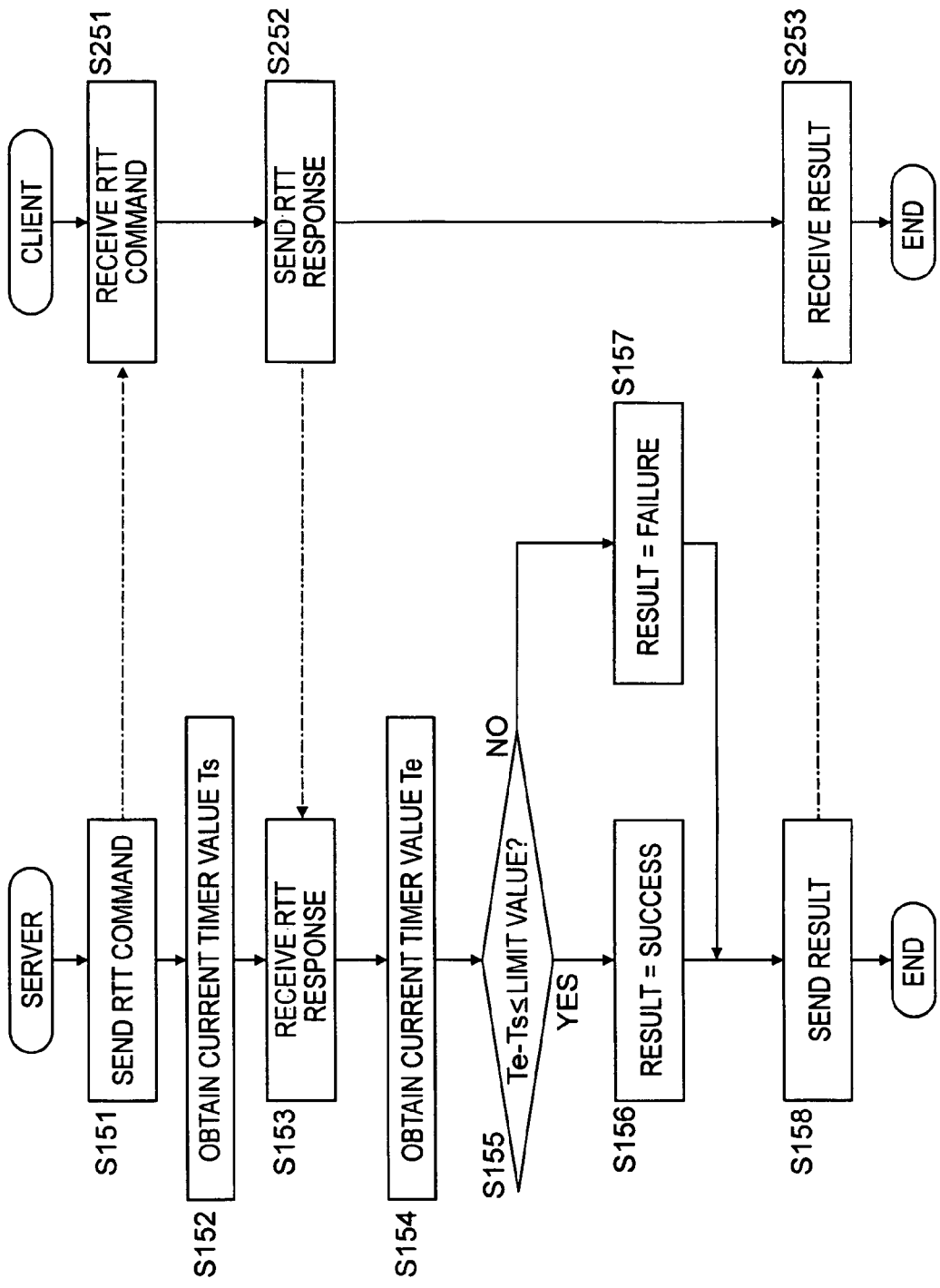
FIG. 8 is a flowchart for explaining an RTT-check processing sequence for measuring a time period between the transmission of a communication packet to a client and the return to a server.

In step S162, S263, the private-use range verification by the RTT check described with reference to FIG. 8 is performed, and both the server and the client determine the result of the RTT check (steps S163 and S264). If the RTT check fails, that is to say, if the client is determined to be outside of the private-use range, the subsequent processing is not performed, and the processing is terminated. That is to say, the use-expiration date reset of the copy-content stored by the client is not performed.

If the RTT check is successful, that is to say, if the client is determined to be within of the private-use range, the server determines whether or not the client-ID has been registered in step S164. The matching is performed between the client-ID added to the use-available period reset request command received from the client in step S161 and the client-ID stored in the storage part 120 (see FIG. 2) in the server. If the client-ID has not been registered, the subsequent processing is not performed, and the processing is terminated.

If the client-ID has been registered, the processing proceeds to step S165, and the server obtains the latest move-processing execution timing-information: Tv from the storage part. Next, in step S166, the server compares the move-processing execution timing Tv and the previous use-expiration date setting processing timing Tr received from the client in step S161 as follows.

move-processing timing (Tv)>previous use-expiration
date setting processing timing (Tr)

If the above expression does not hold (No in step S166), the latest move-processing executed in the server is confirmed to have been executed before the previous use-expiration date setting processing timing (Tr). Accordingly, the content on which use period is reset for the client at the previous use-expiration date setting processing timing (Tr) has not been moved, and thus all the content is ensured to be stored in the server. In this case, the server does not send a newly created list to the client, and the processing proceeds to step S171 to obtain the current timer value: Tr'. In step S172, the server sends the obtained timer value as the use-expiration date setting processing timing Tr' to the client.

In step S270, the client receives the use-expiration date setting processing timing Tr' from the server, and store this into the storage part. In step S271, the client updates the use-expiration date corresponding to the server-ID of the server that has requested the use-expiration date setting processing.

move-processing timing (Tv)>previous use-expiration
date setting processing timing (Tr)

On the other hand, if the above expression is satisfied (Yes in step S166), the latest move-processing executed in the server is confirmed to have been executed after the previous use-expiration date setting processing timing (Tr). Accordingly, the content on which use period is reset for the client at the previous use-expiration date setting processing timing (Tr) might has been moved by the move processing performed thereafter.

In this case, the server generates a newly created list and send the list to the client. This processing is the same as the processing described with reference to FIG. 7 before. That is to say, the processing steps S167 to S170 of the server side in FIG. 12 corresponds to the processing steps S145 to S148 of the server side shown in FIG. 7. The processing steps S265 to S269, S271 of the client side in FIG. 12 corresponds to the processing steps S244 to S249 of the client side shown in FIG. 7.

When performing, the list transmission processing, the server performs the processing in steps S171 and S172. That is to say, in step S171, the server obtains the current timer value: Tr', and uses the timer value obtained in step S172 as the use-expiration date setting processing timing Tr' to send it to the client. In step S270, the client receives the use-expiration date setting processing timing information: Tr', and stores this in the storage part. Thereafter, in step S271, the client updates the use-expiration date corresponding to the server-ID of the server that has requested the use-expiration date setting processing.

By the above processing, the client stores the latest use-expiration date setting processing timing Tr, and sends this timing information to the server at next use-expiration date setting processing time. Thereby, the server can determine that new moved content have not occurred when there is no move timing: Tv after the use-expiration date setting processing timing Tr, and can omit the creation and the transmission processing of a new content-ID list.

In this regard, the recording of the timing information at move processing time by the server may be limited to the cases where the server supplies copy content to the client.

(6) Processing to which Moved-Content-ID List is Applied

Next, a description will be given of an example of the processing in which when the server performs content move processing, if the communication is not possible and a copy-content deletion request has not been made for the client, the server creates or updates the moved list including the content-IDs of the moved content, and when performing the copy-content use-expiration date setting processing, the server applies the moved list and request the client to invalidate (delete) the content.

Figure 13:
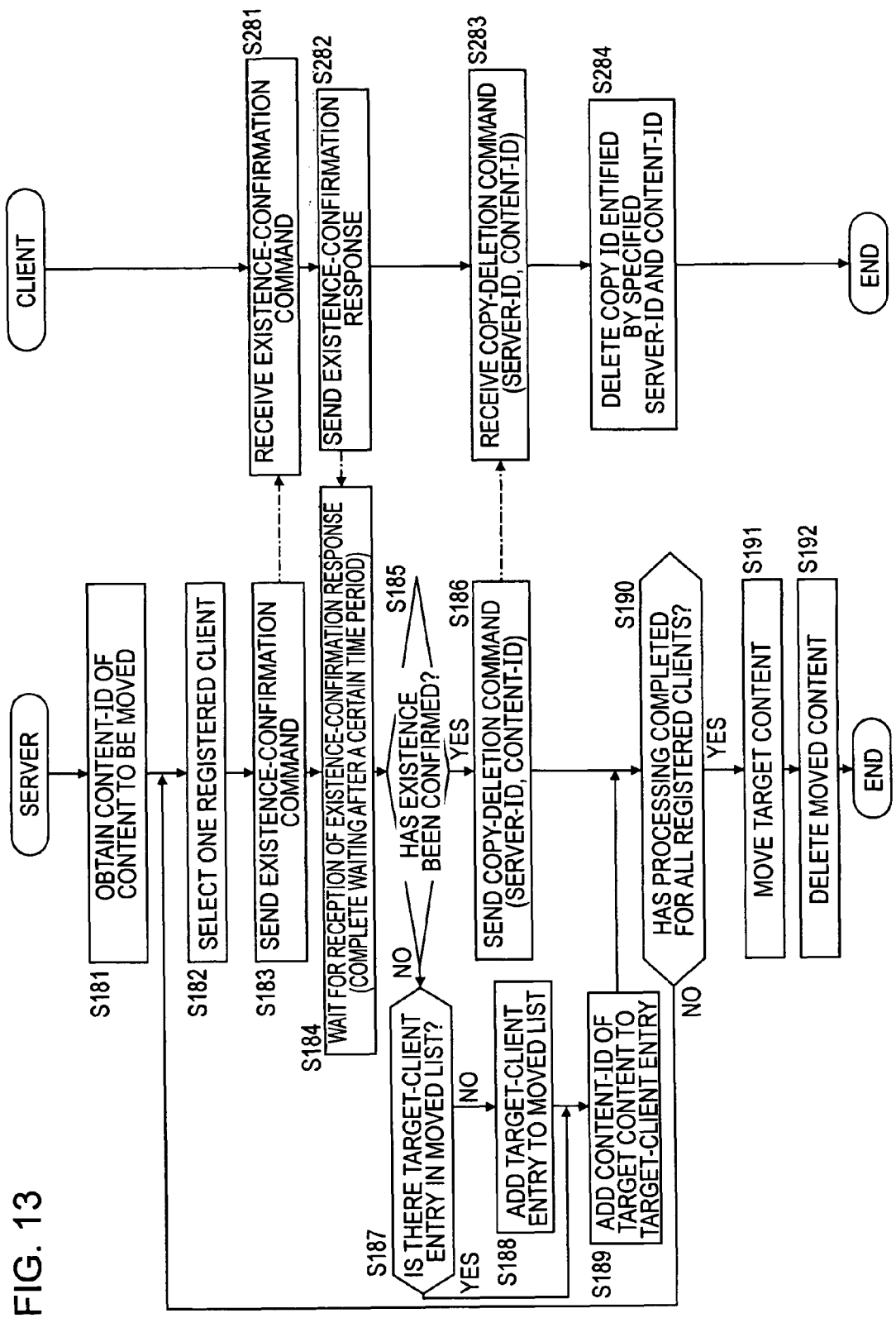
FIG. 13 is a flowchart showing a move-processing execution sequence in a server.

FIG. 13 is a flowchart showing a move-processing execution sequence in a server. In the processing, the moved list generation and update processing is added to the processing described with reference to FIG. 6 before. When the server performs the content move processing, the server sends the content-IDs of the content to be moved and the server-ID of that server as described above. The client performs the invalidation processing of the copy content corresponding to the received content-IDs. Thereafter the server performs content move processing, and deletes the content in the server. However, the copy-content invalidation (deletion) request is not made to the client incapable of communication at that time. In this example, in order to cope with such a client, the moved list that records the content-IDs of the moved content is created in response to the client, and when performing the copy-content use-expiration date setting processing, the server applies the moved list and requests the client to invalidate (delete) the content.

A description will be given of each step of the processing flowchart shown in FIG. 13. In step S181, the server obtains the content-IDs of the content to be moved from the storage part. Next, in step S182, the server selects the clients that have been registered as the copy-content supplied clients, that is to say, selects the client-ID. In step S183, the server sends an existence-confirmation command to the selected clients.

In step S281, when a client has received the existence-confirmation command from the server, the client sends a existence-confirmation response to the server in step S282. If the server receives the response to confirm the existence of the client (Yes in step S185) in a reception-waiting state of the existence-confirmation response in a predetermined time period in step S184, the server sends a copy-deletion command including the content-ID corresponding to the content to be moved and the server-ID in step S186. When the client receives the copy-deletion command, the client reads the server-ID and the content-ID included in the copy-deletion command in step S283, and performs deletion processing of the copy-content corresponding to the content-ID in step S284.

If the existence of the client is not confirmed (No in step S185) in step S185 of the server side, the processing proceeds to step S187. In step S187, the server determines whether there are entries for the clients that have not confirmed their existence in the moved list stored by the server or not. A description will be given of an example of the data structure of the moved list with reference to FIG. 14.

Figure 14:
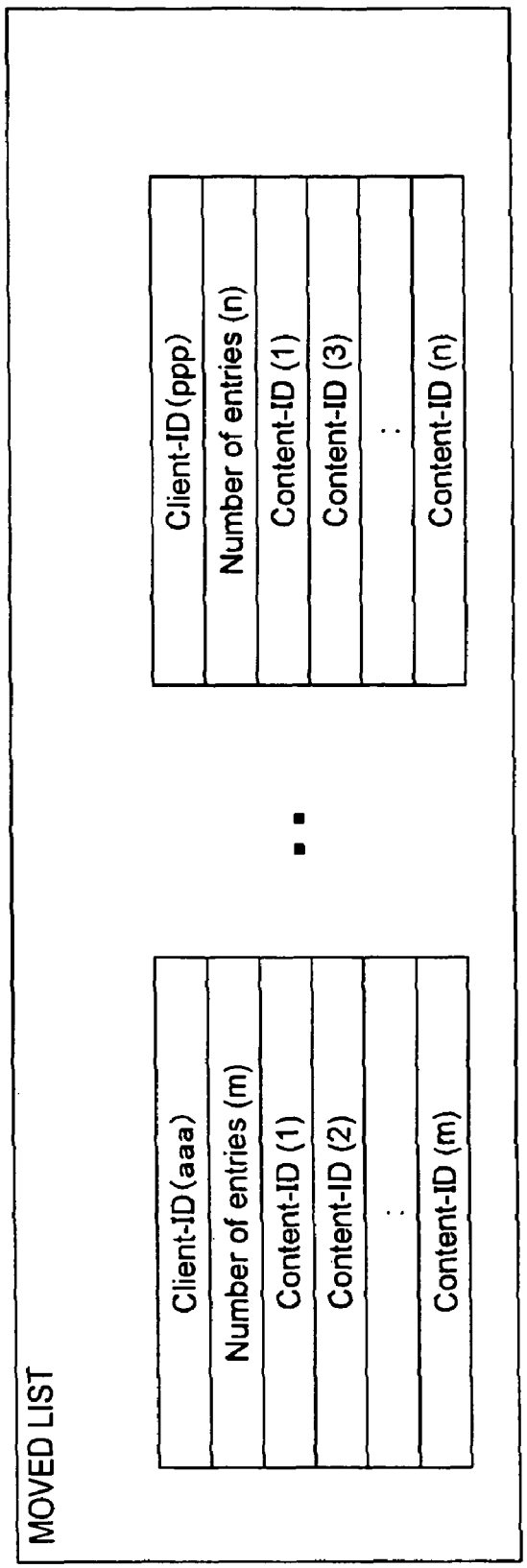
FIG. 14 is an explanatory diagram of an example of the data structure of a moved list.

As shown in FIG. 14, a moved list is individually set corresponding to a client which has been incapable of communication at move-processing execution time and incapable of receiving a copy-content deletion request. A moved list includes each data of the following:

Client-ID;
Number of entries; and
Content-IDs.

In step S187 in FIG. 13, the server checks whether or not the moved list corresponding to the clients which have been incapable of communication are set and stored in the storage part. If not, the server adds the target client entry to the moved list in step S188, and records the list of the content-IDs of the moved content in step S189.

After this processing, the processing proceeds to step S190. In step S190, the server determines whether or not the processing for all the registered clients has been completed. If not completed, the processing returns to step S182, selects another registered client, and the same processing is repeated. If it is confirmed that the processing for all the registered clients has been completed in step S190, the processing proceed to step S191, the move processing of the content to be moved, that is to say, the processing to move the content to another recording medium or another device is performed, and the move content is deleted from the server in step S192. In this regard, the move processing including the processing in steps S191 and S192 is completed.

In this manner, in the flowchart described with reference to FIG. 13, the client which has responded to the existence-confirmation command from the server performs deletion of the copy content. The server creates the moved list including client-IDs and moved content-IDs for the clients which have been incapable of communication.

Figure 15:
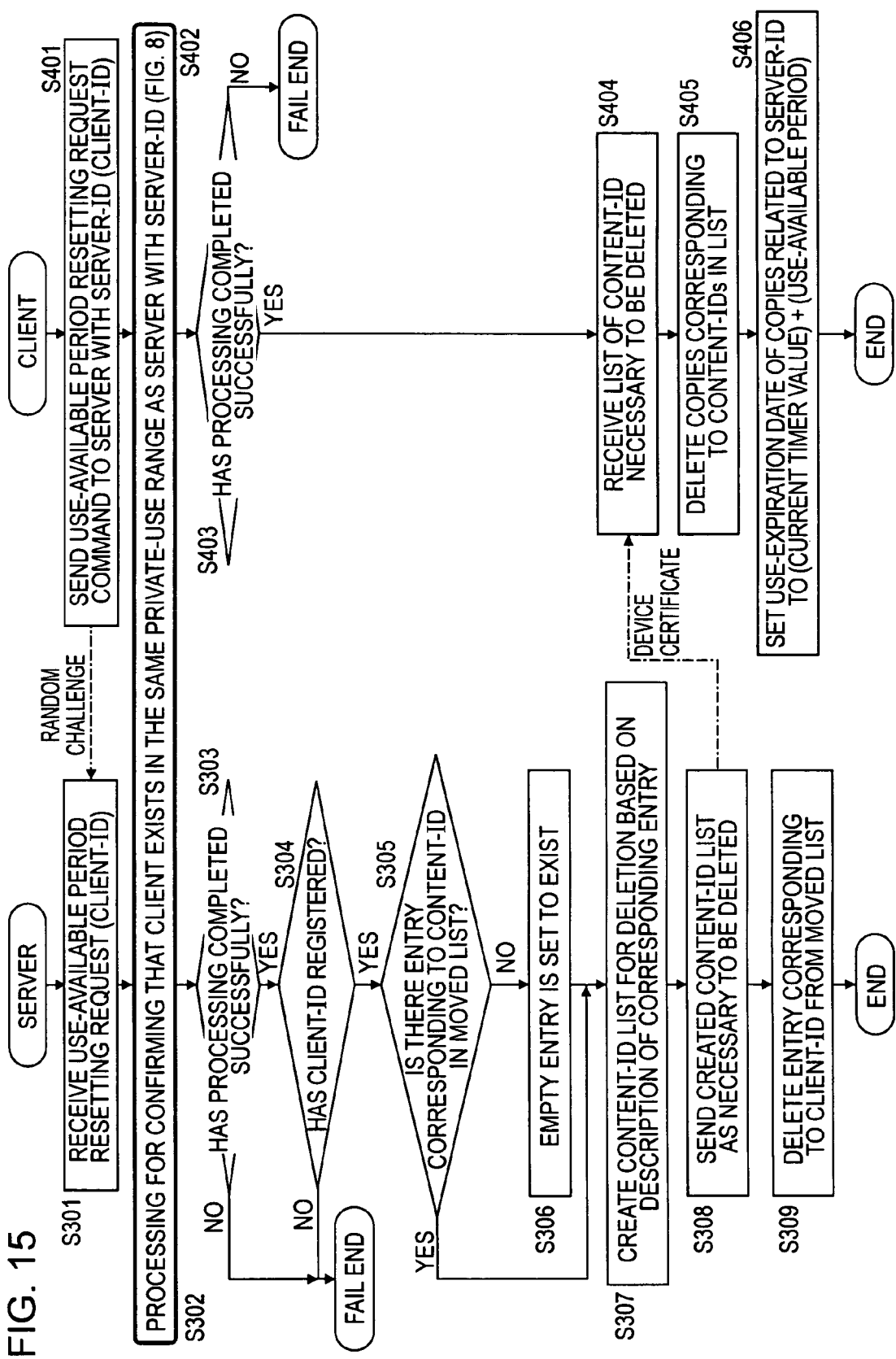
FIG. 15 is a flowchart for explaining a content use-expiration date setting processing sequence to which the moved list is applied.

Next, a description will be given of the copy-content use-expiration date setting processing sequence to which the moved list is applied with reference to FIG. 15. First, in step S401, the client sends a copy-content use-available period reset request command to the server corresponding to server-ID stored in the storage part 220 (see FIG. 2) of the client, that is to say, the copy-content reception server. The client-ID is added to this send command.

The server receives the copy-content use-available period reset request command from the client in step S301, and obtains the client-ID added in the command. Next, in step S302, S402, determination processing on whether or not the client and the server are in the same private-use range is performed. The details of this processing is the same as the processing described with reference to FIG. 8 before. The processing is performed as RTT (Round Trip Time) check processing in which a communication packet is sent to a client and the time period for the packet to return to the server is measured. If RTT is measured to be within a predetermined threshold time period, it is determined that the server and the client are in the same private-use range.

In step S302, S402, the private-use range verification by the RTT check described with reference to FIG. 8 is performed, and both the server and the client determine the result of the RTT check (steps S303 and S403). If the RTT check has failed, that is to say, if the client is determined to be outside of the private-use range, the subsequent processing is not performed, and the processing is terminated. That is to say, the use-expiration date reset of the copy-content stored by the client is not performed.

If the RTT check is successful, that is to say, if the client is determined to be within of the private-use range, the server determines whether or not the client-ID has been registered in step S304. The matching is performed between the client-ID added to the use-available period reset request command received from the client in step S301 and the client-ID stored in the storage part 120 (see FIG. 2) in the server. If the client-ID has not been registered, the subsequent processing is not performed, and the processing is terminated.

If the client-ID has been registered, the processing proceeds to step S305, and the server verifies whether there is an entry corresponding to the client-ID of the client on which the processing is executed in the moved list (see FIG. 14) or not. If there is not, a moved list not including a content-ID is tentatively set in step S306.

Next, in step S307, the server creates a deletion content-ID list storing the content-IDs corresponding to the content stored in the moved list for the client.

An example of the data structure of the deletion content-ID list to be created is shown in FIG. 16A. The list includes the following data:

List transmission source-ID (ID of source)=server-ID;
List transmission destination-ID (ID of destination)=client-ID;
Number of entries;
Content-ID; and
Received random number from transmission destination (random challenge from destination)=random challenge obtained from a client.

The content-ID is the content-ID set in the moved list created by the server for each client, that is to say, the content-ID corresponding to the content on which move processing has been performed in the server and has been deleted from the server. The other parts of the data structure is the same as that described with reference to FIG. 9A.

The server sends the created deletion content-ID list (FIG. 16A) and the device certificate, that is to say, the public-key certificate shown in FIG. 16B to the client. The public-key certificate shown in FIG. 16B has the same data structure as that of the public-key certificate described with reference to FIG. 9B.

In step S404, the client receives the deletion content-ID list from the server, and performs verification. In step S405, the client deletes the copy content corresponding to the content-ID included in the deletion content-ID list received from the server.

Next, in step S406, the client performs the update processing of the use-available periods of copy content not included in the deletion content-ID list. That is to say, the client performs the processing to set the use-expiration date related to the server-ID to a new use-expiration date. The use-expiration date setting processing is performed by setting the use-expiration date calculated by the following expression, for example, use-expiration date=(current timer value)+(use-available period).

This processing is the same as the processing described with reference to FIG. 7 before.

In the present embodiment, the server creates a list including only the content-IDs corresponding to the content on which move processing is performed, and sends the list to the client. It is therefore possible to reduce transmission data, and thus the data processing efficiency is improved.

Finally, a description will be given of an example of a hardware configuration of a PC as an example of the information processing unit constituting a server and a client with reference to FIG. 17.

A central processing unit (CPU) 501 executes various processing in accordance with the programs stored in a read only memory (ROM) 502, a hard disk drive (HDD) 504, etc., to function as data processing means or as communication control processing means. A random access memory (RAM) 503 stores programs to be executed by the CPU 501 and data appropriately. The CPU-501, the ROM 502, the RAM 503, and the HDD 504 are connected to one another through a bus 505.

An input/output interface 506 is connected to the bus 505. An input part 507 including, for example, a keyboard, a switch, a button, or a mouse, etc., which is operated by the user, and an output part 508 including an LCD, a CRT, a speaker, etc., which presents various information to the user, are connected to the input/output interface 506. Further, a communication part 509 which functions as data transmission/reception means, and a drive 510 to which a removable recording medium 511 such as a magnetic disk, an optical disc, a magneto-optical disc, or a semiconductor memory, etc., can be attached, and which reads or writes data from/to the removable recording medium 511 are connected to the input/output interface 506.

Figure 17:
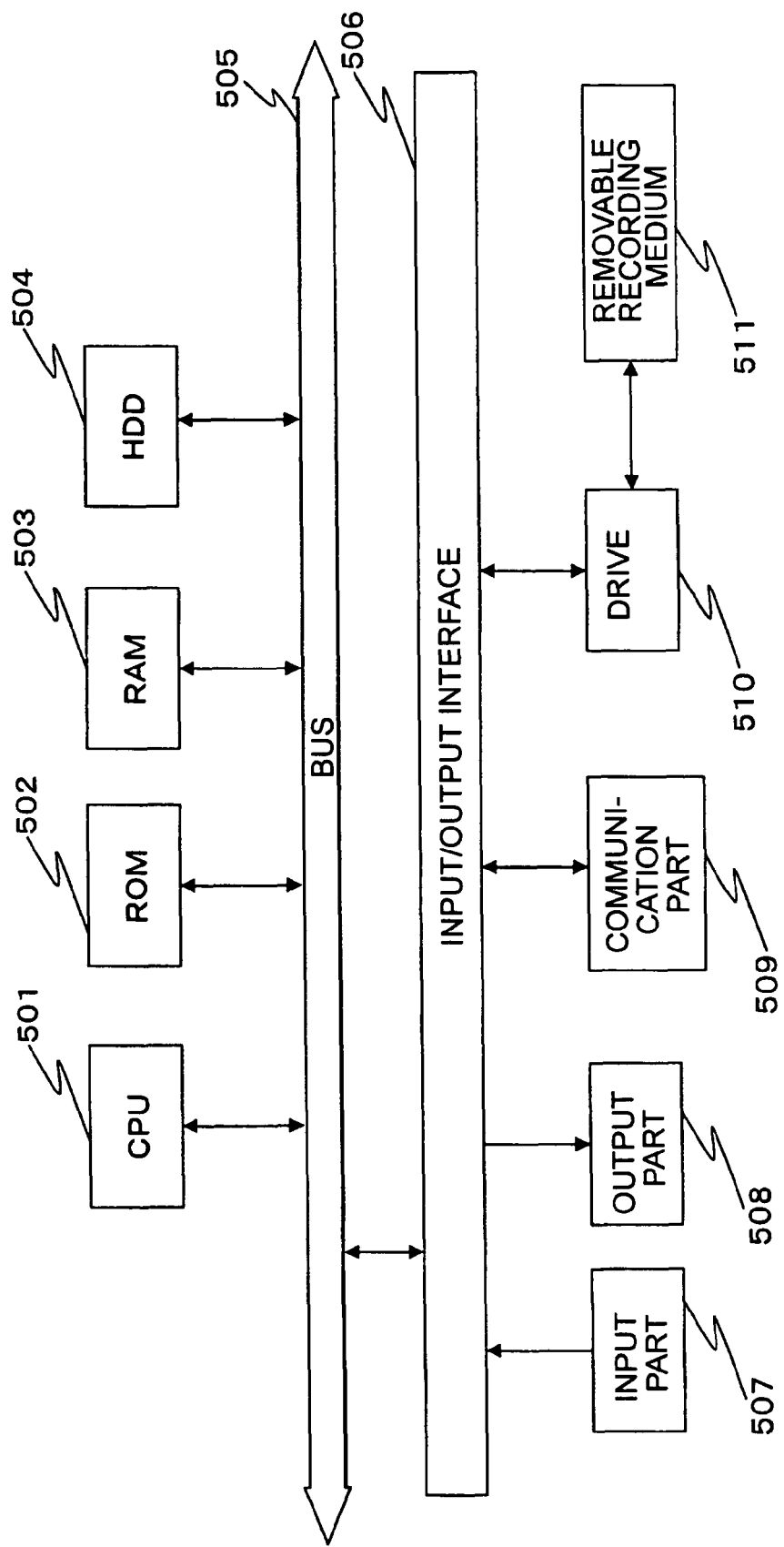
FIG. 17 is a diagram showing an example of hardware configurations of a server and a client.

The configuration shown in FIG. 17 is an example of a server and a personal computer (PC) as an example of network-connected devices shown in FIG. 1. However, the network-connected devices are not limited an PC, but can include a mobile terminal such as a cellular phone, a PDA, etc., and a various electronic equipment such as a reproduction device, a display unit, etc., and an information processing unit. Accordingly, it is possible to have hardware configurations specific to individual devices, and thus processing in accordance with each hardware is performed.

The present invention has been described in detail with reference to specific embodiments. However, it is apparent that various modifications, combinations, sub-combinations and alternations are possible by those skilled in the art without departing from the spirit and scope of the invention. That is to say, the present invention has been disclosed by way of exemplary embodiments, and should not be construed as limited to the embodiments described above. The gist of the invention should be understood within the scope of the appended claims or the equivalents thereof.

In this regard, a series of processing described in this specification can be performed by hardware, software, or a combination of both. When performing the processing by software, it is possible to install the program, which records the processing sequence, into the memory of a computer built in a dedicated hardware and to execute it. Alternatively, it is possible to install the program into a general-purpose computer capable of executing various processing and to execute it.

For example, the program can be recorded in a hard disk of a read-only memory (ROM) as a recording medium in advance. Alternatively, the program can be stored temporarily or permanently in a removable recording medium such as a flexible disk, a compact disc read-only memory (CD-ROM), a magneto-optical (MO) disc, a digital versatile disc (DVD), a magnetic disk, a semiconductor memory, etc. Such a removable recording medium can be supplied as a so-called software package.

In this regard, the program can be transferred from a download site to a computer by a wireless connection or by a wired connection through a network such as a local area network (LAN), the Internet, etc., in addition to installing it from a removable recording medium described above into the computer. The computer can receive the program transferred in such a manner, and install it into the recording medium such as an internal hard disk, etc.

In this regard, various processing described in this specification may be executed in parallel or individually in accordance with the processing capacity of an apparatus on which the processing is performed in addition to the execution of the processing in time series in accordance with the description. Also, in this specification, a system is considered to be a logical set of plurality of devices, and thus each device is not necessarily contained in the same case.

What is claimed is:

1. A server/client hardware system, comprising:

a server configured to store content; and a client machine including a processor configured to receive and store copied content from the content stored in the server, wherein the client machine includes a storage unit configured to store a content-ID and use-expiration date information indicating a date in which content can no longer be used, corresponding to the copied content received from the server, the server generates a content-ID list including content-IDs corresponding to content for which use-expiration-date updating is permitted from among the copied content stored in the client machine, for transmission to the client machine, the client machine selectively updates the use-expiration date of the copied content stored in the client machine and the client machine automatically invalidates the copied content stored in the client machine based on the content-ID list received from the server, the server performs confirmation processing when the client machine is in a private-use range, and executes transmission of the content-ID list to the client machine when the server receives confirmation that the client machine is in the private-use range, the server stores a moving time variable Tv indicating a time when moving of the stored content from the server to another device or storage medium is executed, executes comparison between the moving time variable Tv and a content expiration date variable Tr indicating when the use of the copied content expires, and if the moving time variable Tv is before the content expiration date variable Tr of the copied content executed at a previous time, the server performs permission processing of a new use-expiration date setting for the copied content stored in the client machine without transmitting the content-ID list to the client machine, the confirmation processing executed by the server of the client machine in a private-use range is performed as round-trip-time (RTT) check processing, and for the RTT check processing, the server transmits a packet to the client machine and measures a time period for the packet to return to the server, the server determines that the server and the client machine are in the private-use range when the time period is within a predetermined threshold, and the server only permits the client to update the use-expiration date of the copied content when the server and the client machine are in the private use range.

2. The server/client system according to claim 1, wherein when the content-ID list received from the server is a content-ID list including content-IDs corresponding to content for which use-expiration-date updating is permitted, the client machine updates the use-expiration date of the copied content corresponding to a content-ID included in the content-ID list out of the copied content stored in the client machine, and the client machine performs invalidation processing of the copied content corresponding to a content-ID not included in the content-ID list out of the copied content stored in that client machine.

3. The server/client system according to claim 1, wherein when the content-ID list received from the server is a content-ID list including content-IDs corresponding to content for which use-expiration-date updating is not permitted, the client machine performs invalidation processing of the copied content corresponding to a content-ID included in the content-ID list out of the copied content stored in that client machine, and the client machine performs update processing of the use-expiration date of the copied content corresponding to a content-ID not included in the content-ID list out of the copied content stored in that client machine.

4. The server/client system according to claim 1, wherein the server performs notification processing of a content-invalidation request with a content-ID of content to be transferred to the client machine when transferring the stored content, and the client machine performs invalidation processing of the copied content corresponding to the content-ID included in the content-invalidation request.

5. The server/client system according to claim 1, wherein the server performs notification processing of a content-invalidation request with a content-ID of content to be moved to the client machine and generates and stores a moved list relating a client-ID of a notification-incapable client to a content-ID of moved content when moving the stored content, the server generates a deletion-content-ID list storing the content-ID recorded in the moved list corresponding to the client machine and sends the list to the client machine when the client machine requests setting of the copy-content use-expiration date, the client machine performs invalidation processing of the copied content corresponding to the content-ID included in the deletion-content-ID list out of the copied content stored in that client machine, and the client machine updates the use-expiration date of the copied content corresponding to the content-ID not included in the deletion-content-ID list out of the copied content stored in that client machine.

6. An information processing unit configured to store content and function as a server to supply copied content to a client machine, comprising:

a generator configured to generate, in response to reception of a copied-content use expiration date setting request from a client machine, a content-ID list storing content-IDs corresponding to content for which use-expiration-date updating is permitted out of the copied content stored in the client machine, for transmission to the client machine;

a transmission hardware processor configured to transmit the content-ID list to the client machine;

wherein the client machine selectively updates the use-expiration date of the copied content stored in the client machine and the client machine automatically invalidates the copied content stored in the client machine based on the content-ID list received from the server, the information processing unit confirms existence of the client machine in a private-use range, and executes transmission of the content-ID list to the client machine when the confirmation is received, the information processing unit stores a moving time variable Tv indicating a time when moving of the stored content from the information processing unit to another device or storage medium is executed, executes comparison between the moving time variable Tv and a content expiration date variable Tr indicating when the use of the copied content expires, and if the moving time variable Tv is before the content expiration date variable Tr of the copied content executed at a previous time, the information processing unit performs permission processing of a new use-expiration date setting for the copied content stored in the client machine without transmitting the content-ID list to the client machine, the confirmation processing of the existence of the client machine in a private-use range is performed as round-trip-time (RTT) check processing, and for the RTT check processing, the information processing unit transmits a packet to the client machine and measures a time period for the packet to return to the information processing unit, the information processing unit determines that the information processing unit and the client machine are in the private-use range when the time period is within a predetermined threshold, and the information processing unit only permits the client to update the use-expiration date of the copied content when the information processing unit and the client machine are in the private use range.

7. The information processing unit according to claim 6, wherein the information processing unit performs notification processing of a content invalidation request with a content-ID of content to be moved to the client machine when moving the stored content.

8. The information processing unit according to claim 6, wherein the information processing unit performs notification processing of a content invalidation request with a content-ID of content to be moved to the client machine and generates and stores a moved list relating a client-ID of a notification-incapable client to a content-ID of moved content when moving the stored content, and the information processing unit generates a deletion-content-ID list storing the content-ID recorded in the moved list corresponding to the client machine and sends the list to the client machine when the client machine requests setting of the copied-content use-expiration date.

9. A method of information processing in a server/client system including a server configured to store content and a client machine including a processor configured to receive from the server copied content from the content stored in the server and storing the copied content, the method comprising:

generating, by the server, a content-ID list storing content-IDs corresponding to content for which use-expiration-date updating is permitted out of the copied content stored in the client machine, transmitting the content-ID list to the client machine;

selectively performing, by the client machine, update processing of a use-expiration date of the copied content stored in that client machine and invalidation processing which automatically invalidates the copied content stored in the client machine based on the content-ID list received from the server;

performing confirmation processing, by the server, of the existence of the client machine in a private-use range, and executes transmission of the content-ID list to the client machine on the condition of having received the confirmation;

storing, by the server, a moving time variable Tv indicating a time when moving of the stored content from the server to another device or storage medium is executed;

executing, by the server, a comparison between the moving time variable Tv and a content expiration date variable Tv indicating when the use of copied content expires, and if the Tv is before the content expiration date variable Tr of the copied content executed a previous time, performing, by the server, permission processing of a new use-expiration date setting of the copied content stored in the client machine without transmitting the content-ID list to the client machine, wherein the confirmation processing executed by the server of the existence of the client machine in a private-use range is performed as round-trip-time (RTT) check processing, and for the RTT check processing, the server transmits a packet to the client machine and measures a time period for the packet to return to the server, the server determines that the server and the client machine are in the private-use range when the time period is within a predetermined threshold, and the server only permits the client to update the use-expiration date of the copied content when the server and the client machine are in the private use range.

10. The method of information processing according to claim 9, wherein when the content-ID list received from the server is a content-ID list storing content-IDs corresponding to content for which use-expiration-date updating is permitted, the client machine performs update processing of use-expiration date of the copied content corresponding to a content-ID included in the content-ID list out of the copied content stored in that client machine, and the client machine performs invalidation processing of the copied content corresponding to a content-ID not included in the content-ID list out of the copied content stored in that client machine.

11. The method of information processing according to claim 9, wherein when the content-ID list received from the server is a content-ID list storing content-IDs corresponding to content for which use-expiration-date updating is not permitted, the client machine performs invalidation processing of the copied content corresponding to a content-ID included in the content-ID list out of the copied content stored in that client machine, and the client machine performs update processing of use-expiration date of the copied content corresponding to a content-ID not included in the content-ID list out of the copied content stored in that client machine.

12. The method of information processing according to claim 9, wherein the server performs notification processing of a content-invalidation request with a content-ID of content to be subjected to move processing to the client machine when performing move processing of the stored content, and the client machine performs invalidation processing of the copied content corresponding to the content-ID included in the content-invalidation request.

13. The method of information processing according to claim 9, wherein the server performs notification processing of a content-invalidation request with a content-ID of content to be moved to the client machine and generates and stores a moved list relating a client-ID of a notification-incapable client to a content-ID of moved content when moving the stored content, the server generates a deletion-content-ID list storing the content-ID recorded in the moved list corresponding to the client machine and sends the list to the client machine when the client machine requests setting of the copy-content use-expiration date, the client machine performs invalidation processing of the copied content corresponding to the content-ID included in the deletion-content-ID list out of the copied content stored in that client machine, and the client machine performs updating of the use-expiration date of the copied content corresponding to the content-ID not included in the deletion-content-ID list out of the copied content stored in that client machine.

14. A method of information processing in a server configured to store content and supply copied content to a client machine including a processor, the method comprising:

receiving a copied-content use-expiration-date request from the client machine;

generating a content-ID list storing content-IDs corresponding to content for which use-expiration-date updating is permitted out of the copied-content stored in the client machine, for transmission to the client machine;

transmitting the content-ID list to the client machine;

the client machine selectively performing update processing of a use-expiration date of the copied content stored in the client machine and invalidation processing which automatically invalidates the copied content stored in that client machine based on the content-ID list received from the server;

performing confirmation processing of the existence of the client machine in a private-use range;

executing transmission of the content-ID list to the client machine on the condition of having received the confirmation;

holding move-processing execution timing Tv when moving of the stored content from the server to another device or storage medium is executed;

executing a comparison between the move-processing execution timing Tv and copied-content use-expiration date setting processing timing a content expiration date variable Tr indicating when the use of the copied content expires; and if the move-processing execution timing Tv is before the content expiration date variable Tr of the copied content executed a previous time, performing permission processing of a new use-expiration date of the copied content stored in the client machine, wherein the confirmation processing of the existence of the client machine in a private-use range is performed as round-trip-time (RTT) check processing, for the RTT check processing, the server transmits a packet to the client machine and measures a time period for the packet to return to the server, the server determines that the server and the client machine are in the private-use range when the time period is within a predetermined threshold, and the server only permits the client to update the use-expiration date of the copied content when the server and the client machine are in the private use range.

15. The method of information processing according to claim 14, further comprising:

performing notification processing of a content-invalidation request with a content-ID of content to be subjected to move processing to the client machine when performing move processing of the stored content.

16. The method of information processing according to claim 14, further comprising:

performing notification processing of a content-invalidation request with a content-ID of content to be subjected to move processing to the client machine and generating and holding a moved list relating a client-ID of a notification-incapable client to a content-ID of the moved content when moving the stored content; and generating a deletion-content-ID list storing the content-ID recorded in the moved list corresponding to the client machine and sending the list to the client machine when the client machine requests the copied content use-expiration date setting processing.

17. A non-transitory computer-readable storage medium encoded with instructions which when executed by a computer cause a processor to execute a program for causing a server for storing content and supplying copied content to a client machine to execute a method comprising:

receiving a copied-content use-expiration-date request from the client machine;

generating a content-ID list storing content-IDs corresponding to content for which use-expiration-date updating is permitted out of the copied-content stored in the client machine, for transmission to the client machine;

transmitting the content-ID list to the client machine;

the client machine selectively performing update processing of a use-expiration date of the copied content stored in that client machine and invalidation processing which automatically invalidates the copied content stored in the client machine based on the content-ID list received from the server;

performing confirmation processing of the existence of the client machine in a private-use range;

executing transmission of the content-ID list to the client machine on the condition of having received the confirmation;

holding move-processing execution timing Tv when moving of the stored content from the server to another device or storage medium is executed;

executing a comparison between the move-processing execution timing Tv and copied-content use-expiration date setting processing timing a content expiration date variable Tr indicating when the use of the copied content expires; and if the move-processing execution timing Tv is before the content expiration date variable Tr of the copied content executed a previous time, performing permission processing of a new use-expiration date of the copied content stored in the client machine, wherein the confirmation processing of the existence of the client machine in a private-use range is performed as round-trip-time (RTT) check processing, and for the RTT check processing, the server transmits a packet to the client machine and measures a time period for the packet to return to the server, the server determines that the server and the client machine are in the private-use range when the time period is within a predetermined threshold, and the server only permits the client to update the use-expiration date of the copied content when the server and the client machine are in the private use range.

* * * * *